US011670101B2

(12) United States Patent
Sievert et al.

(10) Patent No.: US 11,670,101 B2
(45) Date of Patent: Jun. 6, 2023

(54) AUTOMATED IDENTIFICATION, ORIENTATION AND SAMPLE DETECTION OF A SAMPLE CONTAINER

(71) Applicant: INVEOX GMBH, Garching bei München (DE)

(72) Inventors: Dominik Sievert, Munich (DE); Maria Sievert, Munich (DE)

(73) Assignee: INVEOX GMBH, Munich (DE)

( * ) Notice: Subject to any disclaimer, the term of this patent is extended or adjusted under 35 U.S.C. 154(b) by 0 days.

(21) Appl. No.: 16/981,205

(22) PCT Filed: Feb. 21, 2019

(86) PCT No.: PCT/EP2019/054333
§ 371 (c)(1),
(2) Date: Sep. 15, 2020

(87) PCT Pub. No.: WO2019/174884
PCT Pub. Date: Sep. 19, 2019

(65) Prior Publication Data
US 2021/0374382 A1 Dec. 2, 2021

(30) Foreign Application Priority Data
Mar. 16, 2018 (EP) .................................. 18162225

(51) Int. Cl.
*G06V 30/14* (2022.01)
*G06V 30/16* (2022.01)
(Continued)

(52) U.S. Cl.
CPC ..... *G06V 20/693* (2022.01); *G01N 35/00732* (2013.01); *G06T 7/248* (2017.01);
(Continued)

(58) Field of Classification Search
CPC ............ G06K 9/00134; G06K 9/0014; G06K 9/4647; G01N 35/00732; G06T 7/248;
(Continued)

(56) References Cited

U.S. PATENT DOCUMENTS 6,827,265 B2 * 12/2004 Knowles ............ G02B 19/0052
235/472.01
8,184,694 B2 * 5/2012 Srinivasan ............. H04N 19/61
375/240.03
(Continued)

FOREIGN PATENT DOCUMENTS

CN 108139413 A * 6/2018 ............. B01L 3/545
EP 2370849 A1 10/2011
WO 2013033253 A1 3/2013

OTHER PUBLICATIONS

International Search Report dated Jul. 16, 2019 for corresponding International Application No. PCT/EP2019/054333.

*Primary Examiner* — Philip P. Dang
(74) *Attorney, Agent, or Firm* — Tarolli, Sundheim, Covell & Tummino L.L.P.

(57) ABSTRACT

A method and a system of detecting at least one sample in a sample container, comprising a sample container, further comprising a cavity, the volume of said cavity partially or fully occupied with at least one solid sample and at least one fluid; and at least one camera capturing at least one image of the sample container; and a data processing device detecting at least one sample in the sample container by processing the at least one image captured by the at least one camera. The method and system further comprise putting the sample container in sudden motion prior to the at least one camera capturing at least one image of the sample container.

17 Claims, 20 Drawing Sheets

(51) Int. Cl.
*G06V 20/69* (2022.01)
*G06T 7/62* (2017.01)
*G06T 7/90* (2017.01)
*G06T 7/246* (2017.01)
*G06T 7/70* (2017.01)
*G01N 35/00* (2006.01)
*G06V 10/50* (2022.01)

(52) U.S. Cl.
CPC .................. *G06T 7/62* (2017.01); *G06T 7/70* (2017.01); *G06T 7/90* (2017.01); *G06V 10/507* (2022.01); *G06V 20/695* (2022.01); *G06T 2207/20021* (2013.01); *G06T 2207/20132* (2013.01); *G06T 2207/30024* (2013.01); *G06T 2207/30204* (2013.01)

(58) Field of Classification Search
CPC .... G06T 7/62; G06T 7/70; G06T 7/90; G06T 2207/20021; G06T 2207/20132; G06T 2207/30024; G06T 2207/30204
See application file for complete search history.

(56) References Cited

U.S. PATENT DOCUMENTS

| | | | | |
|---|---|---|---|---|
| 8,765,057 | B2* | 7/2014 | Wang | G01N 1/38 422/68.1 |
| 8,830,509 | B2* | 9/2014 | Muramatsu | H04N 1/6027 358/1.9 |
| 9,588,026 | B2* | 3/2017 | McKeen | G01N 35/0099 |
| 9,600,982 | B2* | 3/2017 | MacIntosh | G07G 1/06 |
| 9,910,054 | B2* | 3/2018 | Johns | G01N 21/27 |
| 10,110,854 | B2* | 10/2018 | Hunt | H01L 22/26 |
| 10,145,801 | B2* | 12/2018 | Nault | G01N 33/24 |
| 10,187,659 | B2* | 1/2019 | Yamamoto | H04N 19/30 |
| 10,203,762 | B2* | 2/2019 | Bradski | H04N 21/414 |
| 10,577,511 | B2* | 3/2020 | Larimer | B05D 7/548 |
| 10,715,843 | B2* | 7/2020 | Van Brandenburg | H04N 21/23439 |
| 10,979,727 | B2* | 4/2021 | Hannuksela | H04N 19/174 |
| 11,009,467 | B2* | 5/2021 | Park | G01J 3/462 |
| 11,068,679 | B2* | 7/2021 | Rodriguez | G06V 20/52 |
| 2003/0085280 | A1* | 5/2003 | Tsikos | G02B 19/0095 235/454 |
| 2014/0142959 | A1* | 5/2014 | Chubarev | G10L 21/038 704/500 |
| 2015/0214004 | A1* | 7/2015 | Pavia | H01J 37/20 250/306 |
| 2016/0216286 | A1* | 7/2016 | Holmes | G01N 35/00732 |
| 2017/0109879 | A1* | 4/2017 | Urbano | G06T 7/20 |
| 2017/0204279 | A1* | 7/2017 | Larimer | C09D 5/00 |

* cited by examiner

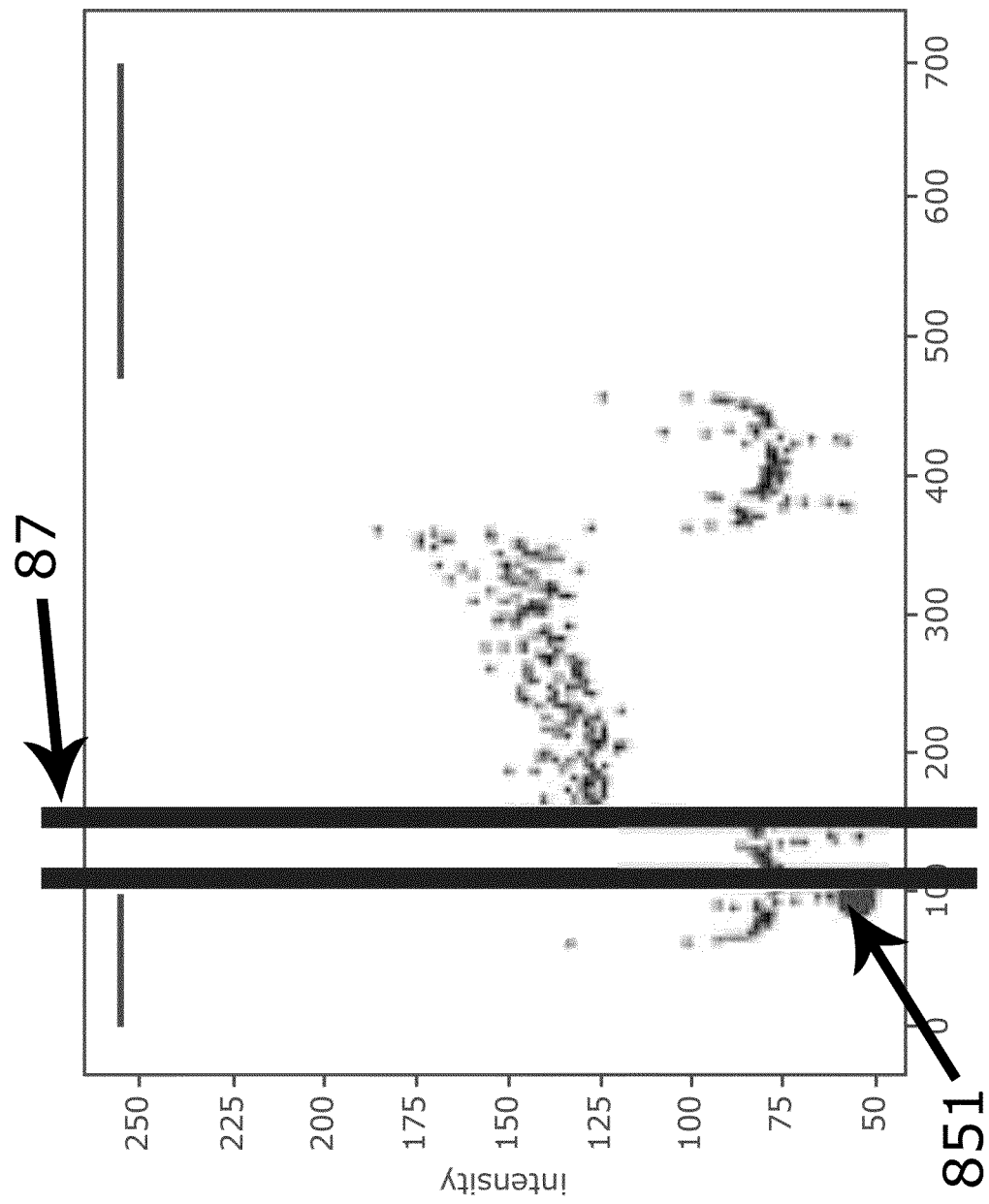

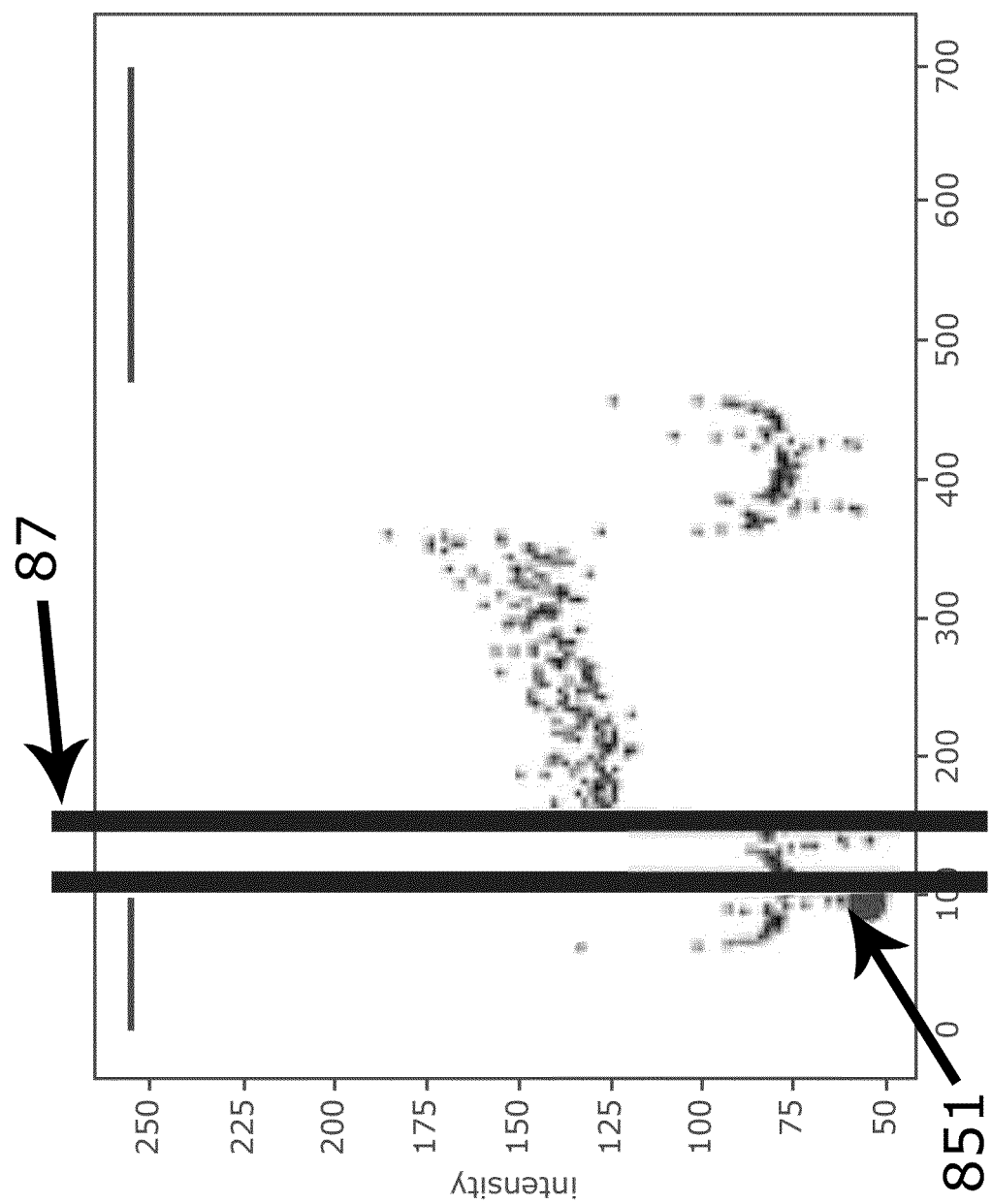

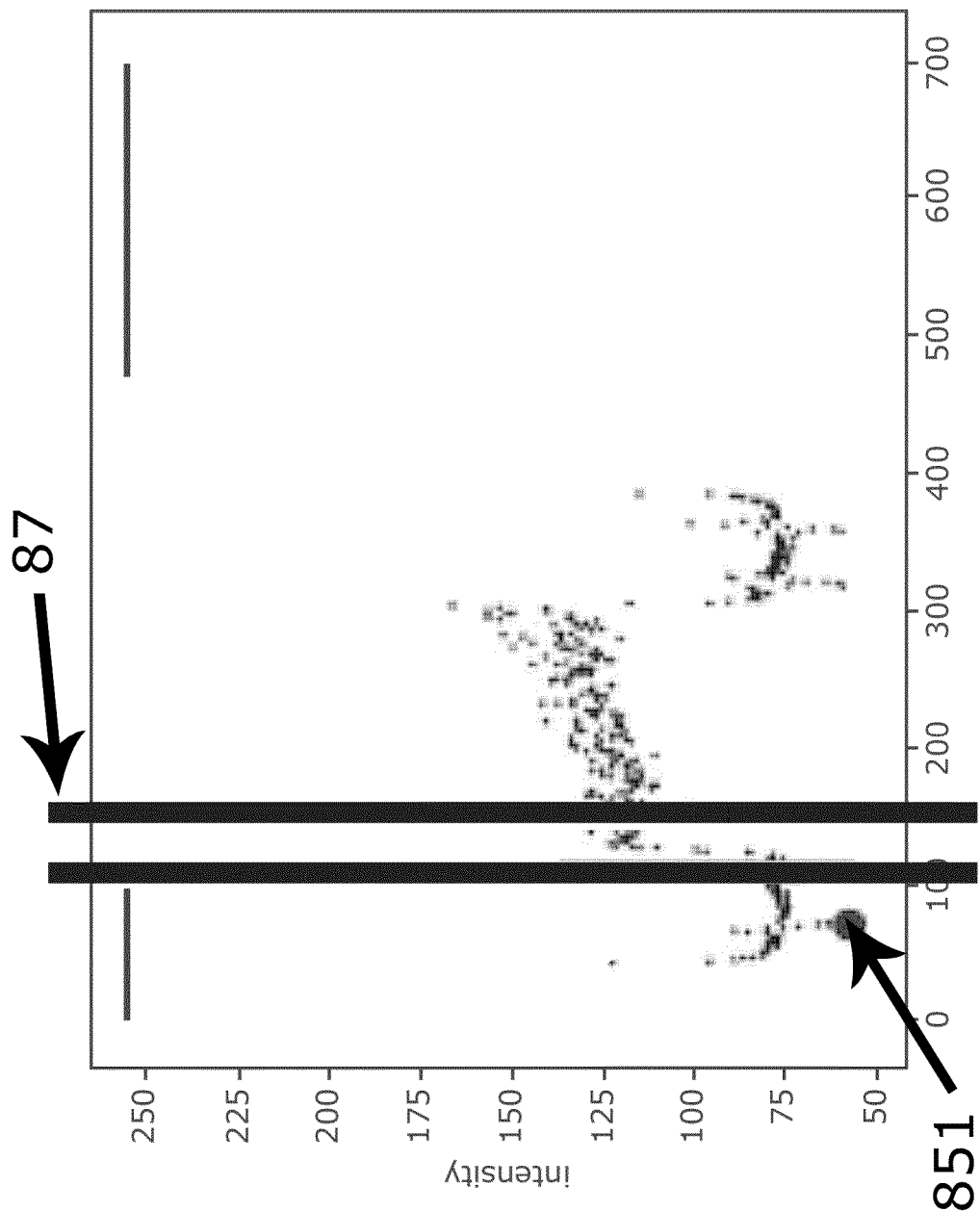

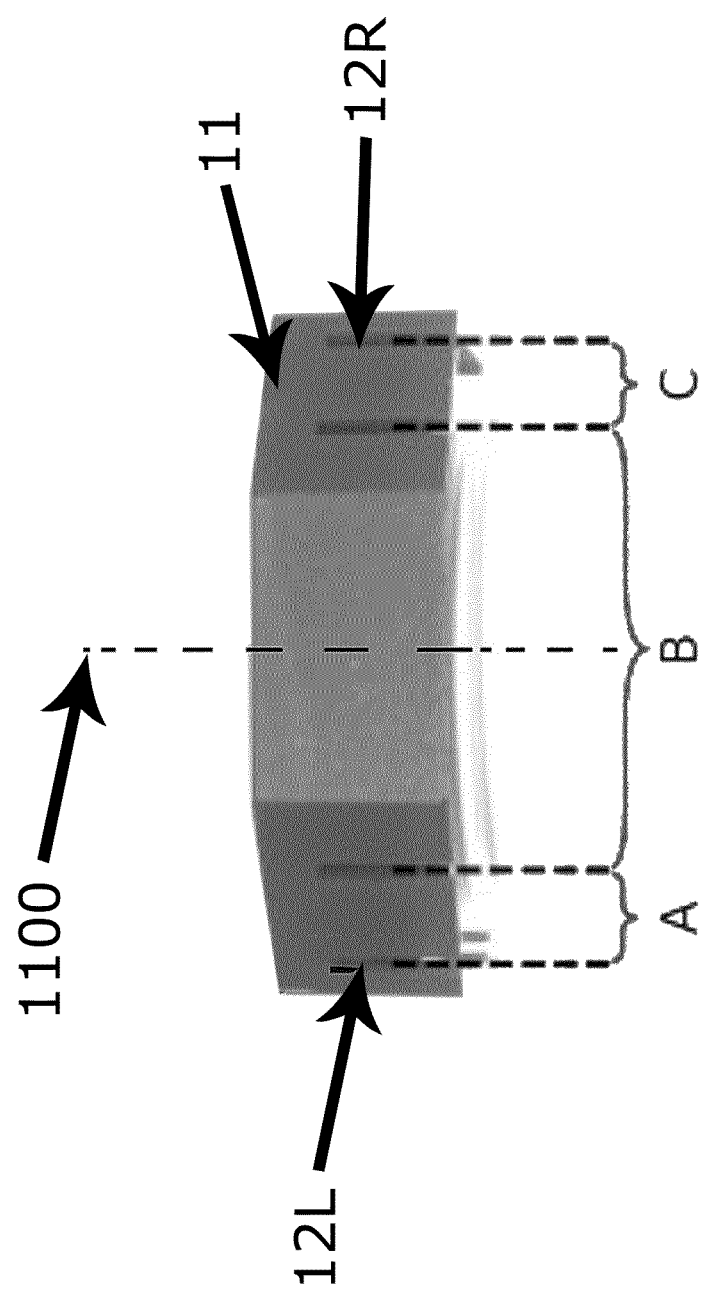

(a)

(b)

(c)

(d)

(e)

(f)

(a)

(b)

(c)

(d)

(e)

(f)

AUTOMATED IDENTIFICATION, ORIENTATION AND SAMPLE DETECTION OF A SAMPLE CONTAINER

RELATED APPLICATIONS

The present application is a U.S. National Stage application under 35 USC 371 of PCT Application Serial No. PCT/EP2019/054333, filed on 21 Feb. 2019; which claims priority from EP Patent Application No. 18162225.9, filed 16 Mar. 2018, the entirety of both of which are incorporated herein by reference.

FIELD

The present invention relates to the identification of a specimen container and detection of the orientation of the sample container. The present invention also relates to the detection of the specimen, particularly a histological a pathological, a medical, a biological, a veterinary and an agricultural sample, contained in the specimen container.

BACKGROUND

The term pathology or histology itself is usually referred to the study of disease in general, incorporating a wide range of bioscience research fields and medical practices (including plant pathology and veterinary pathology), or more narrowly to describe work within the contemporary medical field of "general pathology," which includes a number of distinct but inter-related medical specialties that diagnose disease—mostly through analysis of tissue, cell, and body fluid samples.

As a field of general inquiry and research, pathology addresses four components of disease: cause, mechanisms of development (pathogenesis), structural alterations of cells (morphologic changes), and the consequences of changes (clinical manifestations). In common medical practice, general pathology is mostly concerned with analyzing known clinical abnormalities that are markers or precursors for both infectious and non-infectious disease and is conducted by experts in one of two major specialties, anatomical pathology and clinical pathology. Further divisions in specialty exist on the basis of the involved sample types (comparing, for example, cytopathology, hematopathology, and histopathology), organs (as in renal pathology), and physiological systems (oral pathology), as well as on the basis of the focus of the examination (as with forensic pathology).

The largest amount of samples origin from biopsies and are tissue samples. Presently they are collected by doctors and further downstream handled by staff. The biopsy samples are put into container with preservation liquids, shipped and then manually extracted from the containers in a laboratory for further examination.

This procedure can cause errors regarding the origin of the samples and also expose the staff to infectious or poisonous material.

SUMMARY

It is an object of the present invention to provide an improved or alternative system and method for an automated identification, orientation and sample detection of a sample container, particularly comprising a pathological, a medical, a biological, a veterinary and an agricultural sample.

This object is attained with the embodiments in accordance with the present specification and/or subject matter in accordance with the embodiments and/or claims.

In a first embodiment a method of detecting at least one sample in a sample container is disclosed. The sample container comprises a cavity, the volume of said cavity partially or fully occupied with at least one solid sample and at least one fluid. The solid sample can be a biopsy sample, such as a tissue. The solid sample container can hold a histological, a pathological, a medical, a biological, veterinary or agricultural sample. The fluid can be a liquid, such as, formalin. The fluid can also comprise gel like structures, such as broth solutions, more specifically agar-based broth solutions.

The method of sample detection comprises at least one camera capturing at least one image of the sample container. That is, the sample container can be provided within the field of view (also referred as angle of view) of the at least one camera.

The method of sample detection further comprises a data processing device detecting at least one sample in the sample container by processing the at least one image captured by the at least one camera.

The method of sample detection can allow for the detection of a sample in a sample container in an automatic manner. That is, when otherwise a skilled person would have to see the sample container and try to detect the presence of samples in the sample container, or even has to take the sample out for closer inspection, the current invention provides a method wherein this process can be automatized by having at least one camera capturing at least one image of the sample container and a data processing device detecting at least one sample in the sample container by processing the said images of the sample container. In addition, contents of the sample container can be dangerous to a person handling the sample container. For example, the samples comprised in the sample container can comprise infectious tissues, which can be transmitted to a person being exposed to it. Similarly, the fluids comprised in the sample container can be poisonous or cancerogenic and can damage the health of a person exposed to them. Hence, the method of sample detection presented in this document, not only facilitates an automation process for handling a sample container, but at the same time contribute on reducing instances of persons being exposed to fluids, materials or organism, contained in the sample container, that can damage their health.

Furthermore, the method can facilitate an estimation of the presence and number of samples in a sample container. This can be advantageous, for documentation purposes, particularly, by automating such process. In addition, it is often the case that in a laboratory environment the sample container can be handled by multiple apparatus and/or persons, which can sometime result in losses of samples during such processes. The current method, can be carried out before and after a processing of the sample container in order to determine if a sample was lost during the processing or not.

In addition, the results obtained by the method of sample detection, such as a decision on whether there is a sample in the sample container and/or number of samples in the sample container and/or a feature of at least one sample in the sample container can be compared with known information regarding the sample container. Said information may be obtained in an information label comprised by the sample container. Further, this information can be communicated via a network or entered into an IT platform, or cloud. Said comparison can, for example, be used to improve the accuracy of the results of the method of sample detection or can for example be used to determine if the right number of samples in present in the sample container or not.

In some embodiments, the sample detection method can further comprise putting the sample container in a sudden movement prior to the at least one camera capturing at least one image of the sample container. It can be often the case that due to gravity forces and/or adhesion samples in the sample container can lie at the base of the sample container, i.e. at the bottom. Hence, in such instances it can be harder to detect them. A sudden motion of the sample container, can lift or detach the samples in the sample container from the base of the sample container, e.g. the sample can start floating in the fluid that can occupy the cavity of the sample container. Thus, it can easier detect the sample container or the sample in the container. For example, if the samples lie at the bottom of the sample container they may not appear clearly on an image captured by a camera from the side of the sample container, compared to the case when the samples are at a higher height compared to the bottom of the sample container.

The sudden motion can be a rotational motion, translational motion or both and can last for at least 0.05 seconds and at most 120 seconds, preferably at least 0.05 seconds and at most 5 seconds. A quicker sudden motion, for example 0.05 seconds, can decrease the total time needed to detect a sample, since less time is wasted on creating the sudden motion. On the other hand, some samples, such as heavier samples, require a longer sudden motion to be detached from the base of the sample container. Hence, it can be advantageous to choose the shortest lasting time for the sudden motion that can achieve to detach targeted samples in the sample container from the base of the sample container and to put them in motion. Nevertheless, longer lasting times for the sudden motion can be used, such as 120 seconds or at least 0.05 seconds and at most 120 seconds.

In some embodiments of sample detection method, the at least one camera can capture the images of the sample container with a frame rate of one or more image(s) per second during a limited period of time. However, in some embodiments the frame rate and the time during which the images are captured can be adjusted with respect to each other. For example, the images can be captured with a rate of around 24 images per second. The time during which the images are captured can be around 5 seconds. This can be advantageous for facilitating a fast detection of the samples in the sample container, as less time is wasted on capturing the images. However, the time of capturing the images can also be longer.

In some embodiments, the sample detection method of sample detection can further comprise cropping the at least one image of the sample container captured by the at least one camera to comprise only a region of interest, preferably the region of interest comprising the sample container, more preferably the region of interest comprising the cavity of the sample container. That is, to detect the samples only in regions of images comprising the sample can be of interest. Furthermore, it can be certain that the samples are in the sample container, more preferably in the cavity of the sample container. Furthermore, the position of the camera relative to the sample container can be known and can be fixed. This can be used to estimate the position of the sample container on the image, which can facilitate the cropping of the image to comprise approximately only the sample container, or more preferably only the cavity of the sample container. Since cropping can result in a smaller image, which means that the amount of data processed by the data processing device can decrease. Hence, the data processing device can detect the sample quicker.

In some embodiments, the sample detection method of sample detection can further comprise tiling the at least one image captured by the at least one camera. Tiling an image can refer to the process of diving an image into at least two tiles, i.e. smaller parts. An image, can be divided into at least two tiles and at most 64 tiles, preferably at least 6 tiles and at most 16 tiles, such as 9 tiles. A small number of tiles can increase the error of detecting a sample but can be efficient in terms of the time needed to carry out the method of sample detection. On the other hand, a larger number of tiles, such as 64 tiles can increase accuracy of detecting the samples, however it can cost an increase in the amount of data to be processed by the data processing device. In preferred embodiments, tiles can be equally sized and/or with a rectangular shaped. For example, the tiling of the image can be rendered by subdividing an image by a regular grid, hence creating rectangular, equally sized tiles.

In some embodiments of sample detection method, at least two images of the sample container can be captured by the at least one camera. Furthermore, at least two images can be tiled and they can comprise corresponding tiles. Preferably, all the images of the sample container captured by the camera can be tiled and for all pairs of images there can exist at least one pair of corresponding tiles. Two corresponding tiles comprise the sample position in an image. For example, two equally sized tiles, e.g. rectangular tiles comprising the same width and height, positioned with their centers on the center of their respective images (or in any other position, as long as it is the same position for both tiles) can be corresponding tiles. Two tiles can be corresponding if they depict the same view, for example the same view of the sample container.

Thus, in a sequence of images of the sample container captured by the at least one camera, a sequence of corresponding tiles can be created. The corresponding tiles, can thus represent the evolving of the view they represent, over time. Hence, the corresponding tiles can facilitate detection of a movement in the region they depict during the time the respective images were captured by the at least one camera.

In some embodiments, the sample detection method can further comprise comprising calculating a color histogram for at least one tile, preferably for each of the tiles of an image and wherein a color histogram of a tile is a representation of the distribution of color and/or intensity values in the tile. For example, intensity values of each pixel comprised by a tile can be grouped based on their intensity values. The size of such groups can represent the frequency of the respective intensity value. For example, a tile with 100 pixels, wherein each pixel is totally white, the intensity value 255 would have a frequency of 100 and other intensity values would have a value of 0, wherein in this example the intensity values are represented in a scale of 0 to 255, with smaller values representing darker colors.

In some embodiments, the sample detection method can further comprise calculating the area of the color histogram of an image, said area preferably calculated by multiplying the color and/or intensity values with their respective frequency. Further, the area of the color and/or intensity histogram can be a number that can be associated as a representative parameter of a tile, i.e. can be used as a parameter to analyze a tile or a comparison parameter for comparing to tiles. For example, if two corresponding tiles can comprise different area under the color and/or intensity histogram, this can infer presence of a moving object on the region depicted by the tiles.

In some embodiments, the sample detection method can further comprise summing the frequencies of a preferred region of color and/or intensity values on the color and/or intensity histogram of the tile, wherein said preferred region of color and/or intensity values can comprise expected values of the color and/or intensity values of the samples comprised in the cavity of the sample container. In other words, the pixels with a color and/or intensity value similar to the expected color and/or intensity values of the samples in the sample container can be counted. Said count number can be associated as a representative parameter of a tile, i.e. can be used as a parameter to analyze a tile or a comparison parameter for comparing to tiles. For example, if two corresponding tiles can comprise different counts, this can infer presence of a moving object on the region depicted by the tiles. In addition, if the count of pixels with a color and/or intensity value similar to the expected color and/or intensity values of the samples in the sample container is higher than a threshold value, then the presence of a sample in the tile can be inferred.

In some embodiments, the sample detection method can further comprise calculating a changing frequency of a tile by sorting at least 2, preferably at least 5, such as 10 to 20 corresponding tiles based on the time the respective image of the tile is captured and counting the number of detected changes that result from the comparison of consecutive corresponding tiles.

To put it differently, in a plurality of corresponding tiles, two corresponding tiles can be consecutive if their images are captured one after the other, with no other image captured between them. Consecutive corresponding tiles can be compared, based on their representative parameter (such as the area under the histogram). Then, the occurrence of differences between consecutive corresponding tiles higher than a threshold can be counted, said threshold being advantageous to avoid differences caused by artefacts, such as reflections. This count can represent the changing frequency of a tile. For example, in a sorted list of 20 corresponding tiles, 10 changes between neighboring tiles can be detected. Hence the changing frequency of such tiles can be 10. In some embodiments, the changing frequency can be expressed in terms of a relative frequency, wherein the number if changes can be divided by the total number of corresponding tiles considered. In the above example, the changing frequency would be 0.5 (10 divided by 20) instead of 10.

In some embodiments of the sample detection method, tiles with high changing frequency can be neglected, based on the rationale that movements of the fluid can be faster than movements of the samples, due to their different physical properties, such as, density. Hence, tiles with high changing frequency can capture fast moving object, such as the fluid inside the sample container instead of the samples inside the sample container. Thus, it can be advantageous to neglect such tiles to increase accuracy of detecting samples in a sample container.

In some embodiments, the sample detection method can further comprise inferring the detection of a sample in the sample container if the changing frequency of a tile can be within a predefined range. Said predefined range, can be set based on expected physical properties of the sample and the liquid inside the sample container. For example, for heavy samples, it can be expected that their movements (which can be caused by a sudden motion of the sample container) can be slow and thus the changing frequency of the tiles can be smaller. Measurements, using samples with different sizes, preferably with a minimum possible size and a maximum possible size, can be used to determine a range of changing frequencies and wherein said range can be used to infer presence of a sample.

In some embodiments, the sample detection method can further comprise estimating at least one feature of at least one sample in the sample container. In some embodiments, the shape of at least one of the sides of at least one sample in the sample container can be estimated. In some embodiments, the area of at least one of the sides of at least one sample in the sample container can be detected. In some embodiments, the size of at least one sample in the sample container can be detected. In some embodiments, the volume of at least one sample in the sample container can be alternatively or additionally detected. In some embodiments, color information of at least one sample in the sample container can be alternatively or additionally detected.

In some embodiments of the sample detection method, at least one feature of a sample in the sample container can be used to estimate at least one further feature of the sample in the sample container. For example, estimated lengths according to one or two dimensions of a sample can be used to estimate the shape of the sample.

Estimation of at least one feature of the sample can be advantageous, as it can be used to determine the type of the sample. For example, usually different sample types comprise different colors; hence, an estimation on the color of the sample can facilitate an estimation on the sample type.

In some embodiments of the sample detection method, at least two cameras with different angle of views (AOV) capturing two images of the sample container can be used. The at least two cameras, can simultaneously capture images of the sample container. Hence, the estimation of the presence and/or shape and/or size and/or number of samples in the sample container can be done with a higher accuracy.

In some embodiments of the sample detection method, the sample container can be illuminated with blue light while at least one camera can capture at least one image of the sample container. The blue light can be advantageous as it can usually be better absorbed by the samples, particularly tissue samples, inside the sample container. Hence, visibility of the samples can be increased and the detection of sample can be facilitated.

In some embodiments of the sample detection method, the sample that can be comprised in the sample container can be a biopsy sample. For example, the sample can be a tissue sample.

In a second embodiment a method detecting an advantageous orientation of a sample container is disclosed. The method comprises providing at least one sample container, at least one camera, at least one motion generation system and at least one data processing device. The method further comprises triggering a camera to capture at least one image of a sample container and triggering a motion generator system to rotate the sample container and detecting at least one advantageous orientation of the sample container relative to the camera using a data processing device based on an estimation at least one of at least one diameter of the sample container, said diameter representing a width of the sample container at a predefined height relative to a base of the sample container and at least one distance between at least two markers provided on the sample container.

The advantageous orientation can facilitate the automation of a process that handles the sample container. Furthermore, the detection of the advantageous orientation can be automated by the method according to the second embodiment presented herein. For example, the sample container can be put in or on a container base such that it can be handled by an apparatus (for example for carrying out a sample detection method according to the first embodiment). Furthermore, it can be advantageous to orient the sample container in a specific orientation relative to a camera such that to facilitate a further process, for example, a sample detection process. The current method allows for the sample container to be put in any orientation relative to the camera and a detection of the advantageous orientation can be done. Thus, where otherwise a person would have to orient the sample container in a predefined orientation relative to a camera, current method of detecting an advantageous orientation of the sample container allows for an automation of such a process.

In some embodiments, the motion generation system can be a motor, preferably a stepper motor. The stepper motor can be advantageous as it can facilitate rotation of the sample container in a stepwise manner. For example, the motion generation system can rotate the sample container in steps of at least at least 0.9° and at most 45°, preferably at least 1.8° and at most 10°, such as 3.6°.

In some embodiments, the advantageous orientation detection method further comprises rotating the sample container by at least 180°, preferably by at least 360° from an initial orientation. That is, it is often the case that sample container can be symmetric structures; hence, opposing sides of the sample container comprise similar shapes. Thus, there can be two advantageous orientations, positioned in opposing of the sample container. In such cases, or in cases where two cameras in opposing sides of the sample container are used, a 180° rotation can be enough to detect the advantageous orientation. However, in some cases the advantageous orientation can be unique, thus a 360° rotation can be preferred to detect the advantageous orientation.

In some embodiments, the data processing device can control the motion generation system, for example can trigger a rotation of the sample container by providing at least one of an angle of rotation and direction rotation to the motion generation system.

In some embodiments, the data processing device can capture an image of the sample container using at least one camera, after each rotation of the sample container. That is, the data processing device can alternatively control the at least one camera and the data processing device. This can be advantageous, as it can allow the capturing of images of multiple sides of the sample container. That is, images of the sample container in different orientations relative to the camera can be captured.

In some embodiments, the method can further comprise processing at least one image of the sample container to estimate a diameter of the sample container for each or at least some of the processed images. That is, images of the sample container depicting the sample container in different orientation relative to a camera can be captured. Processing such images, at least one diameter of the sample container can be estimated.

In some embodiments, estimating the diameter of the sample container based on an image of the sample container captured by the camera can comprise deriving a line profile at a predefined height relative to the base of the sample container said line profile can be configured to comprise the color and/or intensity values of each of the pixels on the derived line profile and wherein each pixel on the line profile comprises the same height. The derived line profile can be advantageous as it can facilitate the determination of the width of the sample container (i.e. diameter) in the height wherein the line profile can be derived. The pixels on the line profile that can belong to the sample container can be differentiated and detected, for example, based on the color and/or intensity values of the pixels. Such pixels, belonging to the sample container can be counted for an estimation of the diameter of the sample container on the height where the line profile can be derived.

In some embodiments, the advantageous orientation can be associated with a distinct advantageous diameter. That is, when the sample container is in the advantageous orientation the data processing device can estimate a diameter of the sample container which can be the same within at most 10% deviation, preferably within at most 3% deviation, more preferably within at most 1% deviation, with the distinct advantageous orientation. This can be advantageous as it can allow the data processing device to infer the detection of an advantageous orientation once it can estimate a diameter of the sample container which can be the same within at most 10% deviation, preferably within at most 3% deviation, more preferably within at most 1% deviation, with the distinct advantageous orientation.

In some embodiments, the data processing device processes a plurality of images, for example 100 to 200 images. Preferably the images can depict the sample container in different orientations with respect to the camera. More preferably the sample container can be fully rotated, i.e. 360°, in a stepwise manner and for each step rotation an image can be captured. The images can be processed, preferably in the order they were captured, and for each image a diameter of the sample container can be estimated. Further, the data processing device can find the longest list of images captured consecutively wherein for each of the images in the list, a diameter of the sample container which can be same within at most 10% deviation, preferably within at most 3% deviation, more preferably within at most 1% deviation with the distinct advantageous orientation can be estimated. In some embodiments, the data processing device can infer the detection of an advantageous orientation if the said longest list can comprise at least 3 images.

That is, in some embodiments once a diameter of the sample container that can be similar within at most 10% deviation, preferably within at most 3% deviation, more preferably within at most 1% deviation with the advantageous orientation, then it can be inferred the detection of an advantageous orientation. However, this manner may produce errors due to the presence of artifacts, caused by reflection, which may result in erroneous estimations of the diameter of the sample container. Hence, it can be advantageous to infer the detection of an advantageous orientation if a similar diameter of the sample container with the advantageous orientation can be found on multiple consecutive images, such as, on 3 images. Note that the minimum length of the longest list of images captured consecutively (wherein for each of the images in the list, a diameter of the sample container which is same within at most 10% deviation, preferably within at most 3% deviation, more preferably within at most 1% deviation with the distinct advantageous orientation is estimated) can be set based also on the targeted accuracy.

In a third embodiment, a system comprising a data processing device configured to process at least one image of the sample container, a container base configured to receive at least one sample container, a camera configured to capture at least one image of the sample container and a motion generation system configured to produce motion of the sample container.

In some embodiments of the system, the data processing device and the camera can be connected, for example through a wired or wireless connection. Furthermore, the data processing device can control the camera, such as, can trigger the camera to capture at least one image of the sample container. For example, the data processing device can provide a triggering command to the camera.

In some embodiments of the system, the data processing device can access a memory location wherein the camera can store at least one image it can captured. Thus, the data processing device can obtain the images captured by the camera, preferably automatically.

In some embodiments, the data processing device and motion generation system can be connected, for example, through a wired or wireless connection. Furthermore, the data processing device can control the motion generation system to produce a motion of the sample container. For example, the motion generation system can produce a sudden motion of the container base and/or the sample container, wherein the sudden motion can last for at least 0.05 seconds and at most 5 seconds. Nevertheless, longer lasting times for the sudden motion can be used, such as 120 seconds or at least 0.05 seconds at most 120 seconds. The sudden motion can be advantageous as it can detach at least one sample contained in the sample container from the base of the sample container and/or can put at least one sample comprised in the sample container in motion.

In some embodiments, the motion generation system can be configured to rotate the sample container, preferably in a stepwise manner, wherein in each step the sample container (10) can be rotated by an angle of at 0.9° and at most 45°, preferably at least 1.8° and at most 10°, such as 3.6°. In such embodiments, the motion generation system can comprise a stepper motor.

In some embodiments, the system can be configured to carry out the sample detection method of the first embodiment.

In some embodiments, the system can be configured to carry out the advantageous orientation detection method of the second embodiment.

The present technology is also defined by the following numbered embodiments.

EMBODIMENTS

Below, sample detection method embodiments will be discussed. These embodiments are abbreviated by the letter M followed by a number. Whenever reference is herein made to sample detection method embodiments, these embodiments are meant.

M1. A method of detecting at least one sample in a sample container, comprising:

a sample container (10) comprising a cavity, the volume of said cavity partially or fully occupied with at least one solid sample and at least one fluid; and at least one camera (50) capturing at least one image of the sample container (10); and a data processing device (20) detecting at least one sample in the sample container (10) by processing the at least one image captured by the at least one camera (50).

Sudden Motion

M2. A method according to the preceding embodiment, the method further comprising putting the sample container (10) in sudden motion prior to the at least one camera (50) capturing at least one image of the sample container (10).

M3. A method according to the preceding embodiment, wherein the sudden motion is a rotational and/or translational motion and wherein the sudden motion lasts for at least 0.05 seconds and at most 5 seconds.

Cropping

M4. A method according to any of the preceding sample detection method embodiments, the method further comprising cropping the at least one image captured by the at least one camera (50) to comprise only a region of interest, preferably the region of interest comprising the sample container (10), more preferably the cavity of the sample container (10).

Tiling

M5. A method according to any of the preceding sample detection method embodiments, further comprising tiling the at least one image captured by the at least one camera (50); and wherein a tiling of an image comprises diving the image into at least two tiles; and wherein each tile comprises a plurality of neighboring pixels, such as ½ to ¹⁄₆₄, preferably ⅛ to ¹⁄₁₆, more preferably ⅑ of the total amount of pixels of the image and wherein the tiles are preferably equally sized and/or with a rectangular shape.

M6. A method according to the preceding embodiment, wherein at least two of the images of the sample container (10) captured by the at least one camera (50), preferably any pair of the images of the sample container (10) captured by the at least one camera (50), comprise at least one pair of corresponding tiles and wherein two tiles are corresponding if they comprise the same position on the respective images and the same width and height.

M7. A method according to any of the preceding sample detection method embodiments and with the features of embodiment M6, further comprising calculating a color histogram for at least one tile, preferably for each of the tiles of an image and wherein a color histogram of a tile is a representation of the distribution of color and/or intensity values in the tile.

M8. A method according to the preceding embodiment, further comprising calculating the area of the color and/or intensity histogram of an image, said area preferably calculated by multiplying the color and/or intensity values with their respective frequency.

M9. A method according to any of the preceding sample detection method embodiments and with the features of embodiment M8, further comprising summing the frequencies of a preferred region of color and/or intensity values on the color histogram of the tile, wherein said preferred region of color and/or intensity values comprises expected values of the color and/or intensity values of the samples comprised in the cavity of the sample container (10).

Moving Object Detection by Tile Comparison

M10. A method according to any of the preceding sample detection method embodiments and with the features of embodiment M7, further comprising detecting the presence of at least one moving object by comparing at least one pair of corresponding tiles and wherein the presence of a moving object in the tiles is inferred if difference between the compared tiles is found and wherein preferably the difference is above a threshold, such as, a percentage threshold.

M11. A method according to the preceding embodiment and with the features of embodiment M9, wherein the comparison of at least one pair of corresponding tiles comprises comparing the respective area under the histogram of said pair of corresponding tiles.

M12. A method according to any of the preceding sample detection method embodiments and with the features of embodiments M10 and M11, wherein the comparison of at least one pair of corresponding tiles comprises comparing the respective sum of the frequencies of a preferred region of color and/or intensity values on the color histogram of the of said pair of corresponding tiles.

Sample Detection and Liquid Surface Differentiation

M13. A method according to any of the preceding sample detection method embodiments and with the features of embodiment M7, further comprising calculating a changing frequency of a tile by sorting at least 2, preferably at least 5, such as 10 to 20 corresponding tiles based on the time the respective image of the tile is captured and counting the number of detected changes that result from the comparison of consecutive corresponding tiles.

M14. A method according to the preceding embodiment, wherein the calculating changing frequency of a tile is associated to any corresponding tile of the tile which changing frequency is calculated.

M15. A method according to any of the preceding sample detection method embodiments and with the features of embodiment M14, wherein detection of the samples in the sample container is improved by neglecting tiles with a changing frequency above a threshold value.

M16. A method according to any of the preceding sample detection method embodiments and with the features of embodiment M14, wherein a sample in the sample container (10) is detected if a moving object is detected in a tile and the changing frequency of the tile is below a threshold value.

M17. A method according to any of the preceding sample detection method embodiments, the method further comprising estimating at least one feature of at least one sample in the sample container (10), such as:

shape of at least one of the sides of at least one sample in the sample container (10); and/or area of at least one of the sides of at least one sample in the sample container (10); and/or size of at least one sample in the sample container (10); and/or volume of at least one sample in the sample container (10); and/or color information of at least one sample in the sample container (10).

M18. A method according to the preceding embodiment, wherein at least one feature of a sample in the sample container (10) is used to estimate at least one further feature of the sample in the sample container (10).

Cameras

M19. A method according to any of the preceding sample detection method embodiments, wherein at least two cameras (50) with different angle of views (AOV) capturing at least two images of the sample container (10) are used.

M20. A method according to the preceding embodiments, further comprising triggering the at least two cameras (50) simultaneously to capture images of the sample container (10).

M21. A method according to any of the preceding sample detection method embodiments, wherein the at least one camera (50) and the sample container (10) can be positioned such that the sample container (10) is one the center of angle of view of the at least one camera (50).

M22. A method according to any of the preceding sample detection method embodiments, wherein the sample container (10) is illuminated with blue light while the at least one camera (50) captures the at least one image.

Uses

M23. A method according to any of the preceding sample detection method embodiments, wherein the sample comprised in the sample container (10) is a biopsy sample.

Below, sample container advantageous orientation detection method embodiments will be discussed. These embodiments are abbreviated by the letter O followed by a number. Whenever reference is herein made to sample container orientation detection method embodiments, these embodiments are meant.

O1. A method of detecting an advantageous orientation of a sample container, comprising:

providing at least one sample container (10), at least one camera (50), at least one motion generation system (30) and at least one data processing device (20); and triggering a camera (50) to capture at least one image of a sample container (10); and triggering a motion generator system (30) to rotate the sample container (10); and detecting at least one advantageous orientation of the sample container (10) relative to the camera (50) using a data processing device (20) based on an estimation of at least one of:

at least one diameter of the sample container (10), said diameter representing a width of the sample container (10) at a predefined height relative to a base of the sample container (10); and at least one distance between at least two markers (12) provided on the sample container (10).

Rotation

O2. A method according to the previous embodiment, wherein the motion generation system (30) is a motor (30), preferably a stepper motor (30).

O3. A method according to any of the preceding sample container orientation detection method embodiments, the method further comprising rotating the sample container (10) at least 180°, preferably at least 360° from an initial orientation.

O4. A method according to any of the preceding sample container orientation detection method embodiments, the method further comprising the data processing device (20) triggering a rotation of the sample container (10) by controlling the motion generation system (30), such as, providing an angle of rotation and/or direction of rotation to the motion generation system (30).

O5. A method according to any of the preceding sample container orientation detection method embodiments, wherein the at least one camera (50) and the motion generation system (30) are triggered alternatively, such that the at least one camera (50) captures at least one image of the sample container (10) before and/or after each rotation of the sample container (10) by the motion generation system (30).

O6. A method according to any of the preceding sample container orientation detection method embodiments, the method further comprising rotating the sample container (10) stepwise, such that each triggering of the motion generation system (30) rotates the sample container (10) one step, wherein a step is at least 0.9° and at most 45°, preferably at least 1.8° and at most 10°, such as 3.6°.

Estimating Diameter

O7. A method according to any of the preceding sample container orientation detection method embodiments, the method further comprising processing at least one image of the sample container (10) captured by the camera (50) to estimate a diameter of the sample container (10) for each or at least some of the processed images.

O8. A method according to any of the preceding sample container orientation detection method embodiments, wherein estimating the diameter of the sample container (10) based on an image of the sample container (10) captured by the camera (50) comprises deriving a line profile at a predefined height relative to the base of the sample container (10), said line profile comprising the color and/or intensity values of each of the pixels on the derived line profile and wherein each pixel on the line profile comprises the same height.

O9. A method according to the preceding embodiment, the method further comprising determining whether a pixel on the derived line belong to the sample container (10) or not and wherein said determination is based on the color and/or intensity values of the pixel, more specifically based on a comparison of the color and/or intensity values of the pixel with an expected color and/or intensity of the sample container (10).

O10. A method according to the preceding embodiment, wherein the determination whether a pixel on the derived line belong to the sample container (10) or not is facilitated by binarizing the color and/or intensity values of the pixels on the derived line by comparing said values with a threshold value.

O11. A method according to any of the preceding sample container orientation detection method embodiments and with the features of embodiment O8, wherein on the derived line profile there exist two pixels comprising only one neighboring pixel that belong to the sample container (10) and wherein the diameter of the sample container (10) is estimated as the distance between said two pixels.

Longest Consecutive List

O12. A method according to any of the preceding sample container orientation detection method embodiments, wherein the advantageous orientation of the sample container (10) is associated with a distinct advantageous diameter of the sample container (10), such that when the sample container (10) is in the advantageous orientation the data processing device (20) estimates a diameter of the sample container (10) which is the same within at most 10% deviation, preferably within at most 3% deviation, more preferably within at most 1% deviation, with the distinct advantageous orientation.

O13. A method according to the preceding embodiment, the method further comprising the data processing device (20)

processing a plurality of images to estimate a diameter of the sample container (10) for each of the processed images and finding the longest list of images captured consecutively wherein for each of the images in the list, a diameter of the sample container (10) which is same within at most 10% deviation, preferably within at most 3% deviation, more preferably within at most 1% deviation, with the distinct advantageous orientation is estimated.

O14. A method according to the preceding embodiment, the method further comprising the data processing device (20) inferring that if the longest list of images captured consecutively (wherein for each of the images in the list, a diameter of the sample container (10) which is same within at most 10% deviation, preferably within at most 3% deviation, more preferably within at most 1% deviation, with the distinct advantageous orientation is estimated) comprises a length of at least 3 images, then the orientation of the sample container (10) in at least one of the images of said list, preferably the image in the middle of the list, is the advantageous orientation.

Markers

O15. A method according to any of the preceding sample container orientation detection method embodiments, wherein estimating at least one distance between at least two markers (12) provided on the sample container (10) based on an image of the sample container (10) captured by the camera (50) comprises deriving a line profile at a predefined height relative to the base of the sample container (10), such that the line profile can pass through the at least two markers (12) and wherein said line profile comprising the color and/or intensity values of each of the pixels on the derived line profile and wherein each pixel on the line profile comprises the same height.

O16. A method according to the preceding embodiment, the method further comprising determining whether a pixel on the derived line belongs to the at least one of the markers (12) or not and wherein said determination is based on the color and/or intensity values of the said pixel, more specifically based on a comparison of the color and/or intensity values of the pixel with an expected color and/or intensity of the marker (12).

O17. A method according to the preceding embodiment, wherein the markers comprise a distinctive visual feature, such as a distinctive color.

O18. A method according to any of the preceding sample container orientation detection method embodiments, wherein the advantageous orientation of the sample container (10) is associated with distinct advantageous distances between the at least two markers (12), such that when the sample container (10) is in the advantageous orientation the data processing device (20) estimates distances between the markers (12) that are the same within 10% deviation, preferably within at most 3% deviation, more preferably within at most 1% deviation, with the distinct advantageous distances between the at least two markers (12).

O19. A method according to the preceding embodiment, the method further comprising the data processing device (20) inferring that the orientation of the sample container (10) in an image is the advantageous orientation if the data processing device (20) estimates distances between the markers (12) that are the same within at most 10% deviation, preferably within at most 3% deviation, more preferably within at most 1% deviation with the distinct advantageous distances between the at least two markers (12) using the said image.

O20. A method according to any of the preceding sample container orientation detection method embodiments, wherein at least two markers (12), are provided on a side of the sample container (10), such that when said side faces the camera (50) the sample container (10) is in an advantageous orientation.

O21. A method according to the preceding embodiment, wherein four markers (12) are provided and three distances between said markers (12) can be estimated.

O22. A method according to any of the preceding sample container orientation detection method embodiments, wherein the ratio between at least two distances between at least three markers (12) provided on the sample container (10) can be used to detect the advantageous orientation of the sample container (10).

Cap of the Sample Container

O23. A method according to the preceding embodiment, wherein the sample container (10) comprises a cap (11), preferably on the top of the sample container (10).

O24. A method according to the preceding embodiment, wherein the method comprises detecting at least one advantageous orientation of the sample container (10) relative to the camera (50) using a data processing device (20) based on an estimation of at least one diameter of the cap (11)

O25. A method according to the preceding embodiment, wherein the cap (11) comprises a non-circular shape, preferably a hexagonal shape.

O26. A method according to the preceding embodiment, wherein the markers (12) are provided on or in the cap (11) of the sample container (10).

Below, system embodiments will be discussed. These embodiments are abbreviated by the letter S followed by a number. Whenever reference is herein made to sample container orientation detection method embodiments, these embodiments are meant.

S1. A system comprising:
  a data processing device (20) configured to process at least one image of the sample container (10); and
  a container base (132) configured to receive at least one sample container (10); and
  a camera (50) configured to capture at least one image of the sample container (10); and
  a motion generator system (30) configured to produce motion of the sample container (10).

Camera

S2. A system according to the preceding embodiment, wherein the data processing device (20) is connected to the camera (50) such that the data processing device (20) can trigger the camera (50) to capture at least one image.

S3. A system according to any of the preceding system embodiments, wherein the data processing device (20) accesses a memory location wherein the camera (50) stores at least one image it captures.

Motion Generation System

S4. A system according to any of the preceding system embodiments, wherein the motion generation system (130) is configured to transmit motion to the sample container (10) through the container base (132).

S5. A system according to any of the preceding system embodiments, wherein the data processing device (20) triggers the motion generation system (30) to produce a motion of the sample container (10).

S6. A system according to any of the preceding system embodiments, wherein the motion generation system (30) is configured to generate a sudden motion of the sample container (10), such as, a motion that lasts at least 0.05 seconds and at most 5 seconds, and wherein the sudden motion can be a rotational and/or translational motion.

S7. A system according to any of the preceding system embodiments, wherein the motion generation system (30) is configured to rotate the sample container (10), preferably in a stepwise manner, wherein in each step the sample container (10) is rotated by an angle of at 0.9° and at most 45°, preferably at least 1.8° and at most 10°, such as 3.6°.

S8. A system according to any of the preceding system embodiments, wherein the motion generation system (30) is configured to induce a translational motion to the sample container (10), wherein the translational motion is induced by an actuator.

S9. A system according to the preceding embodiment, wherein the actuator is at least one of an electric, a pneumatic and a hydraulic actuator.

S10. A system according to the preceding system embodiment, wherein the motion generation system (30) comprises a stepper motor.

S11. A system according to any of the preceding system embodiments, wherein the data processing device (20) triggers the motion generation system (30) to produce a motion of the sample container (10).

S12. A system according to any of the preceding system embodiments and with the features of embodiment S7, wherein the data processing device (20) is configured to trigger a rotation of the sample container (10) and to provide an angle and/or direction of rotation to the motion generation system (30).

Data Processing Device

S13. A system according to any of the preceding system embodiments, wherein the data processing device (20) comprises data processing components, such as, at least one processor and/or at least one graphical processing unit and/or at least one microcontroller.

S14. A system according to any of the preceding system embodiments, wherein the data processing device (20) comprises or has access to at least one memory component and/or at least one user interface (60).

S15. A system according to any of the preceding system embodiments, wherein the data processing device (20) comprises a system-on-chip and/or an embedded system.

S16. A system according to any of the preceding system embodiments, wherein the data processing device (20) can be programmable.

S17. A system according to any of the preceding system embodiments, wherein the data processing device (20) can execute a machine-readable code to process at least one provided image, said processing of the provided image comprising at least one of:
  cropping an image into a preferred region; and/or
  dividing an image into smaller parts, such as tiling an image; and/or
  calculating a color and/or intensity histogram of an image or part of the image; and/or;
  transforming an image into a grayscale image; and/or
  identifying patterns on an image.

Sample Container

S18. A system according to any of the preceding system embodiments, wherein the sample container comprises a cavity surrounded by a body (13) comprising a base at the bottom and a free top-opening and a cap (11) configured to enclose said top-opening.

S19. A system according to the preceding embodiment, wherein the body of the sample container (10) comprises a cylindrical shape.

S20. A system according to any of the preceding system embodiments and with the features of embodiment S16, wherein the body of the sample container (10) is composed of a transparent solid material.

S21. A system according to any of the preceding system embodiments and with the features of embodiment S16, wherein the cap (11) of the sample container can comprise a non-circular shape, such as a n-edged shape.

S22. A system according to any of the preceding system embodiments and with the features of embodiment S16, wherein the cap (11) can be connected to the body (13) of the sample container (10) in a releasable manner.

S23. A system according to any of the preceding system embodiments and with the features of embodiment S16, wherein the cavity of the sample container (10) can be occupied with at least one sample, preferably with a biopsy sample, and with at least one fluid, preferably one of a preservation, a nurturing and a fixating fluid.

S24. A system according to any of the preceding system embodiments, wherein the sample container (10) comprises at least two markers (12), such as 4 markers (12), preferably positioned in or on the cap (11) of the sample container (10).

S25. A system according to any of the preceding system embodiments, wherein the sample container comprises an identification label (15) configured to hold at least one information field for identification and/or automation purposes.

S26. A system according to the preceding embodiment, wherein the identification label (15) comprises at least one field configured to provide human and/or machine-readable information related to the sample and/or the liquid housed by the container and/or to the originator of the sample.

S27. A system according to any of the preceding system embodiments and with the features of embodiment S23, wherein the identification label (15) comprises at least one field with an electronically readable information source, preferably a RFID chip.

S28. A system according to any of the preceding system embodiments and with the features of embodiment S23, wherein the identification label (15) comprises at least one field with an identification label (15), such as, a QR-code and/or a barcode, that can be detected by the data processing device (20) on an image captured by the camera (50).

System for Tissue Detection

S29. A system according to any of the preceding system embodiments, wherein system is configured to detect at least one sample comprised in the sample container (10) by carrying out the method according to any of the sample detection method embodiments M1 to M24.

System for Sample Container Orientation

S30. A system according to any of the preceding system embodiments, wherein system is configured to detect an advantageous orientation of the sample container (10) by carrying out the method according to any of the sample container orientation detection method embodiments O1 to O26.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

Whenever "pathology" is referred to, also "histological", "medical", "veterinary", "agricultural" or similar expressions are meant.

Wherever a container base is referenced, a section is meant that allows a device to handle the container as a whole or as part, such as apply a motion to the container or its contents.

DETAILED DESCRIPTION OF THE FIGURES

Figure 1:
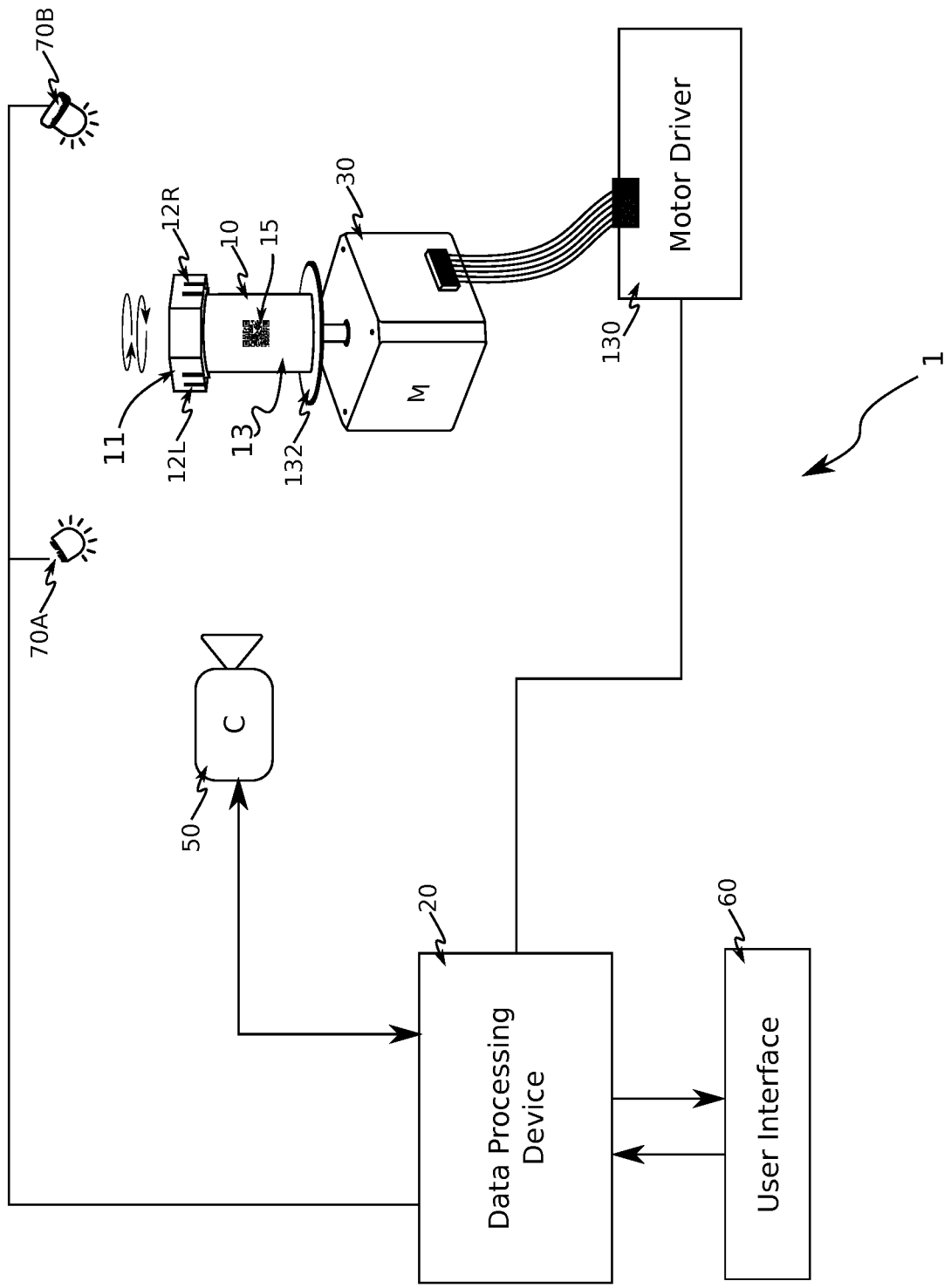
FIG. 1 depicts a schematic of a system configured for identification, orientation and/or sample detection of a sample container.

FIG. 1 provides a schematic description of a system configured for identification, orientation and/or sample detection of a sample container. A sample container 10 that can also be referred as a specimen container 10 can be provided to the system 1. The sample container 10 can comprise a cavity that can be filled by a specimen (or multiple specimens), such as at least one of histological, pathological, medical, biological, veterinary, agricultural tissue and/or biopsy samples, e.g. one tissue sample or multiple tissue samples, and preservation liquids, e.g. formalin, to prevent decay of the specimen.

The cavity of the sample container 10 can be surrounded on the lateral sides (i.e. side walls) and on the base (i.e. bottom) by a body 13. That is, the body 13 encloses the cavity wherein specimens can be put and the body 13 comprises a top opening that can allow specimens and fixation liquids to be put on the cavity of the sample container 10. The top opening of the body 13 can be enclosed by a cap 11. The cap 11, thus, can enclose the sample container's cavity preventing the specimens and/or liquids inside the sample container 10 to escape the cavity of the sample container 10. The cap 11 can assume or can be positioned in a closed position, thus, enclosing the body 13 of the sample container 10, more specifically enclosing the top-opening of the body 13 of the sample container 10. Additionally, the cap 11 can assume or can be positioned in an open position, thus, providing a free top-opening of the body 13 of the sample container 10—which can allow for the insertion and/or extraction of the specimen(s) and/or preservation materials on the sample container 10. In some embodiments, the cap 11 under the exertion of a force can go from the open position to the closed and from the closed position to the open position more than one time—thus, allowing for the opening and closing of the sample container 10 multiple times without damaging, e.g. breaking, the structure of the sample container 10 and/or the cap 11.

In some embodiments, the cap 11 can selectively allow either the preservation liquid or the specimen or both to be inserted and/or extracted (i.e. removed) from the cavity of the sample container 10. For example, the cap 11 can comprise a filtering structure (not shown) configured like a net. The filtering structure can be configured such that to allow the liquid to tunnel (or pass) through it, while blocking the passage of the specimens. The cap 11 can further comprise a blocking structure, which blocks the passage of the specimen and the liquid through it. Both the filtering and the blocking structure can be fixed to the body 13 of the specimen container 10 and with each other. Hence, the top opening of the sample container 10 can be enclosed either with the filtering structure or the blocking structure or both. Further, different filtering structures can be provided that can be configured for different structures and sizes of the specimens—i.e. for small specimens filtering structures with small "holes" can be provided. Further still, multiple filtering structures can be provided to the cap 11, allowing the configuration of different filter sizes.

To put it in simple words, the sample container 10 can be opened and/or closed at least one time, preferably multiple times. In one embodiment, the cap 11 can be pushed towards the body 13 of the sample container 10—thus being arranged into the closed position. Additionally, or alternatively the cap 11 can be pulled from the body 13 of the sample container 10 thus being arranged into the open position. The closing and/or opening of the sample container 10 by putting the cap 11 in a closed or opened position can be facilitated by the use of threads in the sample container 10 and the cap 11. Thus, the cap 11 can close or open the sample container 10 by applying torque onto the cap 11 and/or the sample container 10 (i.e. rotating the cap 11 relative to the sample container 10).

Furthermore, the sample container 10 can comprise at least one left marker 12L and at least one right marker 12R (which can also be jointly referred as markers 12) that can facilitate an estimation of a diameter of the cap 11 and/or the sample container 10 (refer to FIG. 8 for more details). In a preferred embodiment, the markers 12 can be provided in or on the cap 11 of the sample container 10.

In addition, the sample container 10 can comprise identification label 15, such as an optical label 15. The identification label 15 may comprise any machine-readable code, which can comprise a barcode, a QR code, a standardized font set like OCR and/or a human readable information. The identification label 15 may additionally or alternatively comprise an RFID tag or any device, apparatus or assembly of devices configured for near field communication. The identification label 15 may comprise a unique registration number of the sample container 10 which can later be correlated to a specimen. Further, the identification label 15 may comprise information about the type of specimen and/or of a reference for billing and/or identification purposes. The identification label 15 can be detected on at least one of the images captured by the camera 50 of the sample container 10. Furthermore, the information comprised by the identification label 15 can be extracted, in an identification label detection process.

The system 1, can further comprise a container base 132. The container base 132 can be a flat surface, such as, a plate shaped surface, wherein the sample container 10 can be provided to the system 1. The container base 132 can be attached to a motion generator system 30.

For sake of brevity, in FIG. 1 the container base 132 and motion generation system 30 are depicted as being directly connected to each other. However, it will be understood that the container base 132 and motion generation system 30 may also be indirectly connected through a motion transmission system (not shown) that can transmit rotary and/or translational motion from the motion generation system 30 to the container base 132.

The motion generator system 30 can be configured to provide motion, which can be transmitted to the container base 132 and the sample container 10 (if positioned in or on the container base 132). The motion generator system 30 can convert or transform one form of energy, such as but not limited to electrical, magnetic, thermal, chemical, elastic, mechanical into kinetic energy. Thus, the motion generator system 30 can provide rotary motion of the container base 132 and thus, the sample container 10, when sample container 10 is put on the container base 132. Additionally, or alternatively, the motion generator system 30 can provide translational motion of the container base 132 and the sample container 10. For example, the motion generator system 30 can move the sample container in a vertical direction (e.g. push and/or pull) and/or in at least one horizontal direction (e.g. left and/or right and/or back and/or forth). Note, that the vertical direction herein can represent the direction according to the vertical central axis of the sample container 10 (provided with dashed lines in FIG. 1), wherein the vertical central axis can be perpendicular to the top opening of the sample container 10 and/or to the base of the sample container 10 and/or to the surface of the container base 132. The horizontal direction can represent the direction according to any straight line perpendicular to the vertical central axis (provided with dashed lines in FIG. 1).

The motion generator system 30 can be a motor 30, such as a stepper motor 30. For text simplicity, the motion generator system 30 may be referred throughout the text as a motor 30. In the system of FIG. 1 further a motor driver 130 can be provided. The motor driver 130 can be configured for providing the required power and/or control signals, such as direction of movement and/or angle of movement, for driving the motor 30. The motor driver 130 and the motor 30 can thus be connected by a plurality of wires that can transmit the required power and/or control signals from the motor driver 130 to the motor 30.

The system 1 can further comprise a data processing device 20. The data processing device 20 can provide the required control signals to the motor 30 either directly or via a motor driver 130 as depicted in FIG. 1. That is, the data processing device 20 can "control" the motor 30. For example, the data processing device 20 can signal the motor 30, through the wire connections that connect the data processing device 20 with the motor 30 either directly or via the motor driver 130, to rotate in a clock-wise direction stepwise, e.g., by 3.6 degrees. In other words, the data processing device 30 can control the motor 30 to produce movement of the container base 132, such as a movement in a certain direction with a certain angle by providing through a set of control signals the direction and/or the angle of required movement.

The data processing device 20 can comprise means of data processing, such as, (a) processor unit(s), graphical processor unit(s), hardware accelerator(s) and/or microcontroller(s). The data processing device 20 can comprise memory components, such as, main memory (e.g. RAM), cache memory (e.g. SRAM) and/or secondary memory (e.g. HDD, SDD). The data processing device 20 can comprise busses configured to facilitate data exchange between components of the data processing device 20, such as, the communication between the memory components and the processing components.

In other words, the data processing device 20 can be a processing unit configured to carry out instructions of a program. The data processing device 20 can be an image processor unit configured to execute at least one image processing algorithm. The data processing device 20 can be a system-on-chip comprising processing units, memory components and busses. In some embodiments, the data processing device 20 can be an embedded system.

Further, the system 1 can comprise at least one visual sensor, such as at least one camera 50. The camera 50 can be configured to capture images of the sample container 10. Thus, it can be advantageous to adjust the position of the camera 50 and/or the container base 132 and/or the sample container 10, such that, the sample container 10 can be within the field of view of the camera 50. Note, that the field of view of the camera 50 is what the camera 50 "sees", i.e. the view that will be projected on the images captured by the camera 50. The camera 50 can be triggered by the data processing device 20. That is, the data processing device 20 can provide a triggering signal to the camera 50 which triggers the camera 50 to capture an image. For example, the data processing device 20 can provide a plurality of timed triggering signal pulses (a pulse is a transition of the signal from a high voltage, i.e. state "1" to a low voltage, i.e. state "0", which can also be referred as rising edge, and the opposite, which can also be referred as falling edge) that trigger the camera 50 to capture multiple images—e.g. each pulse (rising edge or falling edge or both) can trigger an image capture. The image, or images, captured by the camera 50 can be stored in a memory location inside the camera 50 and/or transferred in a memory location outside the camera 50. It can be advantageous, that the memory location wherein the camera 50 can store the image(s) it captures, can be accessed by the data processing device 20.

Furthermore, it can be advantageous that the data processing device 20 can synchronously control the motor 30 and the camera 50. In one embodiment, the data processing device 20 can alternatively trigger a camera capture and a motor movement (e.g. trigger camera, trigger motor, trigger camera, trigger motor and so on), thus, capturing images of the sample container 10 in multiple orientations of the sample container 10. For example, the data processing device 20 can trigger the camera 50 to capture an image. After, the image is captured the data processing device 20 triggers a motor 30 movement, which can be a clockwise movement of 3.6 degrees, causing the orientation of the sample container 10 to change from the 0° to 3.6° relative to the initial position. After the rotary movement is completed the data processing device 20 can trigger the camera 50 to capture another image and so on. After 100 images and rotations, the sample container would have rotated by 360° (full rotation) and the camera 50 would have captured the whole lateral of the sample container 10 on the images—note that the rotations in this example were done by 3.6° at a time, thus after 100 motor triggers the sample container 10 would have rotated 360° relative to the initial position and after (or before) each rotation an image is captured.

In the above, an exemplary step rotation of 3.6° was provided and described. However, it will be understood that in generally any step rotation can be used and any number of images of the sample container 10 can be captured. In a preferred embodiment, the step rotation and the number of images is set such that images of the whole lateral of the sample container 10 can be captured.

System 1 can further comprise at least one user interface 60 for allowing for data input/output to/from the data processing device 20. The user interface 60 can comprise output user interfaces, such as screens or monitors configured to display visual data (e.g. images captured by the camera 50 and/or processed images) and/or speakers configured to output audio data and/or signals (e.g. audio and/or optical signals indicating a status of the image capturing process) and/or printing devices configured to output information on an output media. Further, a message or signal may be conveyed to a communication network and/or to an IT system like a cloud. The user interface 60 can comprise input user interfaces, such as: keyboard configured to allow the insertion of text and/or other keyboard commands (e.g. allowing the user to enter text data and/or other keyboard commands by having the user type on the keyboard) and/or trackpad, mouse, touchscreen, joystick—configured to facilitate the navigation through different graphical user interface(s).

System 1 can further comprise at least one light emitter 70, such as, light emitting diodes (LED) 70, for example, as depicted in the embodiment of FIG. 1, two light emitters 70A and 70B for lightning two opposing sides of the sample container 10. A plurality of LEDs, such as three or four LEDs and/or one or more at different heights can also be installed. Moreover, LEDs for different light colors and/or intensities and/or for changing the light colors and/or intensities according to the needs can also be provided. The light emitters 70 can be advantageous as they can allow for better images of the sample container 10 to be captured by the camera 50. The light emitter 70 can be controlled by the data processing device 20—thus a wiring between the data processing device 20 and the light emitters 70 can be advantageous. The data processing device can control at least one of: switching state (on/off), intensity, color of the light emitters 70. For example, the data processing device 20 can switch on the light emitters 70 only when an image of the sample container 10 is to be captured. The data processing device 20 can also adjust the brightness and/or color of the light emitted by the light emitters 70, e.g. during a calibration step, to facilitate the image processing algorithms that can be run on the images captured by the camera 50, such that better results and/or recognition can be achieved by the processing of said images.

Figure 2A:
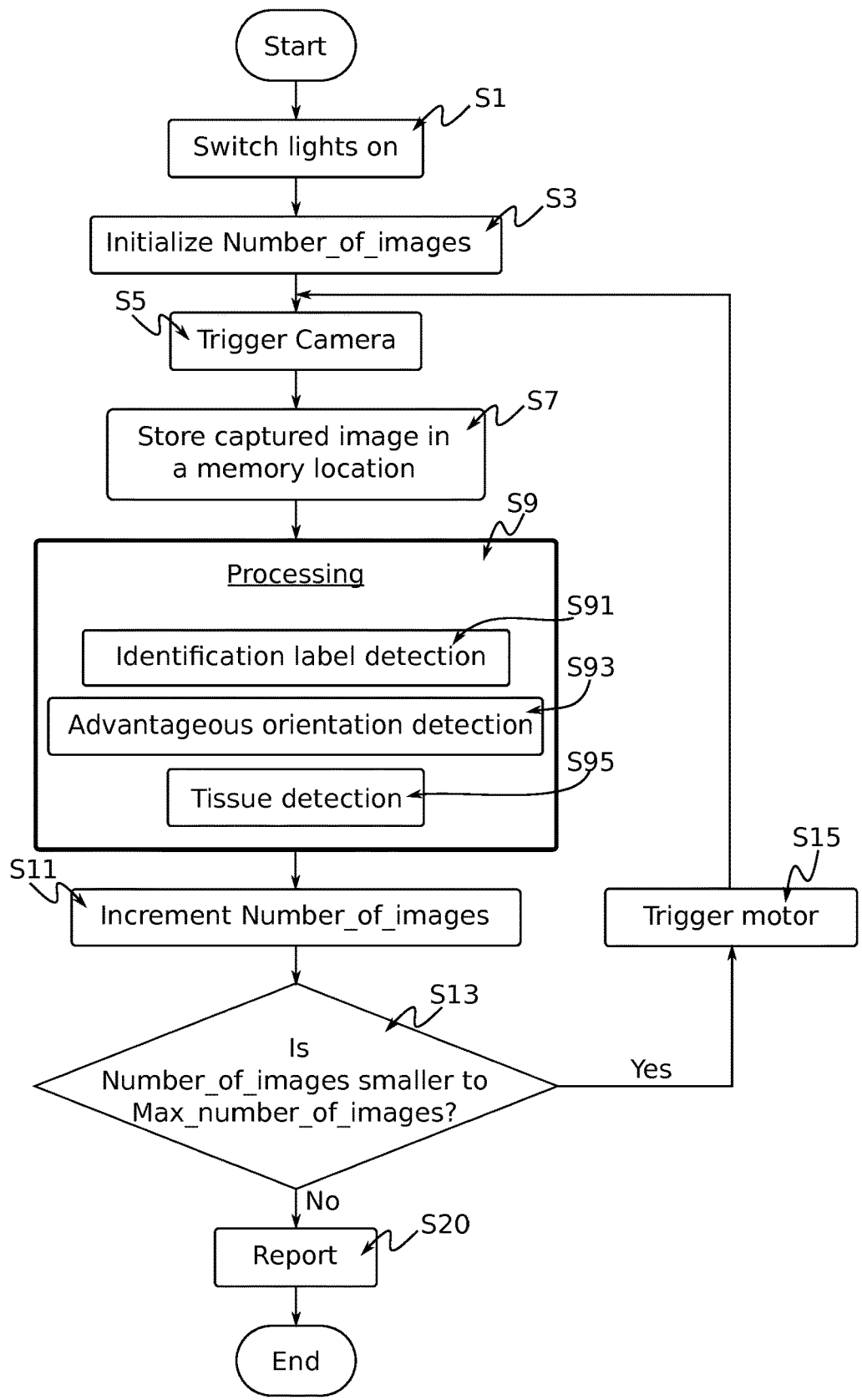
FIG. 2a depicts a flowchart of a method configured for identification, orientation and/or sample detection of a sample container.
Figure 2B:
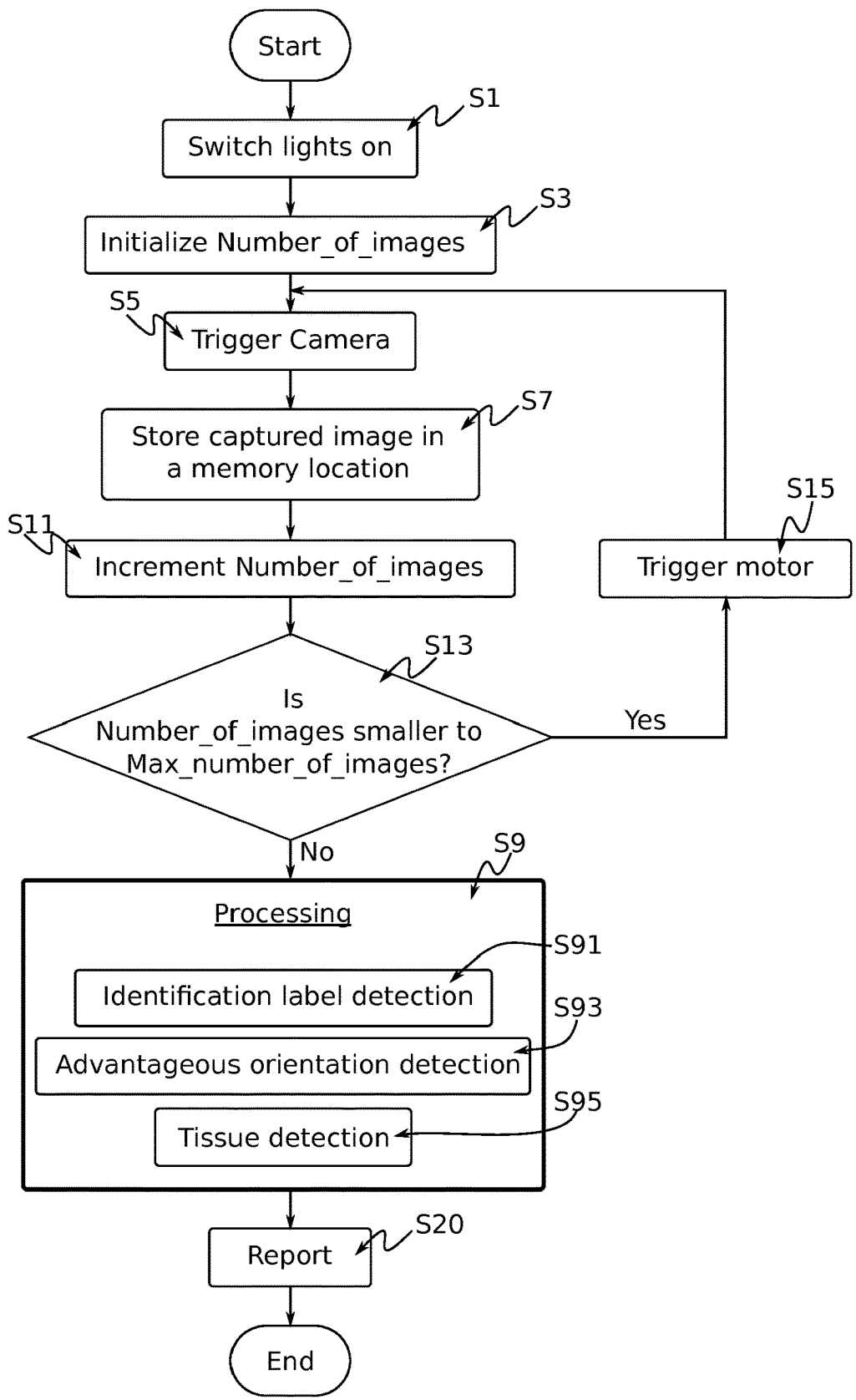
FIG. 2b depicts a flowchart of a method configured for identification, orientation and/or sample detection of a sample container according to another embodiment of the method.

FIG. 2 provides flowcharts describing a method configured for identification, orientation and/or sample detection of a sample container 10. Note that, when referring to FIG. 2 both FIG. 2a and FIG. 2b are meant, in contrast when referring to FIG. 2a or FIG. 2b wherein the respective figure is meant.

The method depicted by the flowcharts of FIG. 2 can allow for the identification of a sample container 10. For example, the sample container 10 can comprise an identification label 15 (refer to FIG. 1) and/or a machine-readable label 15 that can comprise at least one ID of the sample container 10 and the current method can allow the extraction of the information comprised in the identification label 15 of the sample container 10. Additionally, or alternatively, the method described in the flowcharts of FIG. 2 can allow for a cap orientation (or sample container 10 orientation)—i.e. orienting the sample container 10 or the cap 11 (refer to FIG. 1) of the sample container 10 in one of the at least one predefined or advantageous positions. In addition, the method provided in FIG. 2 can allow for the determination of the at least one advantageous orientation. Additionally, or alternatively, the method according to the embodiment of FIG. 2 can allow for tissue detection, more general, the specimen or sample detection that can be comprised by the sample container 10. That is, the said method can allow to determine whether at least one specimen (e.g. tissue sample) can be present on the sample container. The method can also allow to extract features of the specimen, such as the size, shape of the specimen, if the specimen is present in the sample container 10. In a preferred embodiment, the method depicted in FIG. 2 can be used with the system 1, depicted in FIG. 1. Thus, when describing the steps of the method of FIG. 2 the description of respective steps may be illustrated with the elements of system 1.

Referring to FIG. 2a, in a step S1 the method comprises "switching lights on". That is, the data processing device 20 turns-on at least one of the lights 70A and/or 70B.

In step S3 the method comprises "initializing number of images". That is, the data processing device 20 can keep track of the captured images through a data structure, e.g. an integer data type, that can be stored (e.g. in a binary format) in a memory location accessible by the data processing device 20. The number of images captured can be updated, e.g. incremented by one, after (or before) each captured image. Thus, it can be advantageous to initialize such a data structure to a predefined value, for example to zero, which can allow the tracking of the number of images already captured at a moment in time, by simply reading the number stored in the number of images data structure. For example, if number 17 is stored in the number of images data structure, then it can be inferred that 17 images of the same sample container 10 are already captured by the camera 50 (it can also be inferred that 17 rotations steps of the sample container 10 are performed).

The method further comprises steps S5, S7, S9, S11, S13 and S15 which can run in a loop for a predefined number of times. In order to run the loop for a predefined number of times, it can be advantageous that the loop comprises a conditional statement S13. In the provided example the conditional statement S13 can check if the number of captured images exceeds a maximum number of images that need to be captured. The maximum number of images that need to be captured can be set in advance, prior to the start of the method, for example between 50 to 200. For example, if the maximum number of images that need to be captured is set to 100 then the loop can be executed 100 times. To keep track of the captured images a data structure can be used, i.e. the number of captured images data structure discussed above. To put it simple, the number of images data structure can be initialized, for example to zero, in the initialization step S3, can be increment after each captured image in step S11, and its value can be checked in step S13 to ensure that it does not exceed the maximum number of images that need to be captured. These steps (S3, S11 and S13) can allow for the loop to be executed only a predefined number of times, as predefined in the maximum number of images.

Within the loop, in a step S5 the method can comprise "trigger camera". The data processing device 20 can signal the camera 50, to capture an image. If the sample container 10 is positioned in advance in the container base 132 then an image of the sample container 10 can be captured.

In a step S7, the captured image can be stored in a memory location. Said memory location can preferably be accessible by the data processing device 20, such that the data processing device 20 can get such an image as an input to an image processing algorithm it can execute.

In step S9, the method comprises the data processing device 20 processing the captured image, i.e. executing an image processing algorithm on the image. The processing of the captured image can comprise at least one of:

Extraction of information regarding the sample container 10 by identification label detection in a step S91;

Detection of an advantageous orientation of the sample container 10 through an advantageous orientation detection process in a step S93 (for further details refer to FIGS. 3 to 8);

Detection of the presence of a specimen and preferably detection of specimen features through a sample detection process in step S95 (for further details refer to FIGS. 9 to 12).

The method further comprises steps S11 and S13 that can ensure that the loop can run a predefined number of times, as discussed above.

If in step S13 it can be determined that the number of images already captured (which can be stored in the "number of images" data structure) is smaller than a maximum number of images that need to be captured (which can be predefined in the max number of images data structure), then the method can continue through the "Yes" path, to step S15. In step S15, "Trigger motor", the motor 30 can be triggered, which can cause a change in the orientation of the sample container 10 positioned on the container base 132. Thus, the data processing device 20 can provide a direction and an angle through the control signals to the motor 30, which in turn can produce rotary movement of the container base 132 and thus the sample container 10 and cap 11. The rotation can cause part of the of the sample container 10 and the cap 11 to disappear from the field of view of the camera 50 and another part of the sample container 10 and the cap 11 to appear in the field of view of the camera 50—i.e. as the sample container 10 rotates the side of the sample container 10 not facing the camera 50 can eventually face the camera 50 and thus can be captured in the images.

The method can loop back to step S5, thus allowing another image of the sample container 10 to be captured. In some embodiments, by fully rotating the sample container 10, that is 360° relative to the initial position, the whole lateral of the sample container 10 and the cap 11 can be captured.

When all the required images can be captured, i.e. when in step S13 it can be determined that the number of images already captured is not smaller than a maximum number of images that need to be captured, then the method follows the "No" path, to step S20. In the report step S20, the outcomes (i.e. report data) of the method depicted in FIG. 2a can be provided, for example, to a user. The outcomes (i.e. report data) may comprise:

a label identification status indicating whether the process of label identification (step S91) was successful and/or if successful the information extracted from the identification label 15 in the identification label detection step S91; and/or whether the required orientation of the cap was determined or not in step S93; and/or at what angle (relative to initial position) the required cap orientation was achieved in step S93; and/or whether tissue (or the specimen) was detected contained in the sample container 10; and/or features of the detected tissue such as shape or size or number of specimens detected.

In FIG. 2b another embodiment of the method configured for identification, orientation and/or sample detection of a sample container 10 is depicted. One embodiment of this method was described above with reference to FIG. 2a. FIG. 2b comprises another embodiment of such method. In FIGS. 2a and 2b and through the description of the figures, like reference signs refer to like steps, structures or elements. As it can be noticed, the method according to the embodiment of FIG. 2b comprises the same steps S1, S3, S5, S7, S9, S11, S13, S15 and S20 as in the embodiment of FIG. 2a. Thus, a detailed description of such steps will be omitted in the following description of FIG. 2b and only the different features compared to the embodiment of FIG. 2a will be presented.

In the embodiment of FIG. 2a, the processing step S9 is within the loop. That is, an image can be captured and the processing step S9 can be applied to the captured image before capturing the next one. In the embodiment, of FIG. 2b it can be noticed that the processing step S9, is put outside of the loop. That is, firstly all the required images can be captured by having the data processing device 20 alternatively triggering the camera 50 to capture an image and the motor 30 to rotate the sample container 10, as discussed. After all the images can be captured, then the processing step S9 can be executed on the captured images. That is, the loop can be executed faster in the embodiment of FIG. 2b as the triggering of the camera and the motor is not delayed by the processing step S9. However, the disadvantage of the method of embodiment 2b compared to the one in FIG. 2a, is that it may require all the captured images to be stored in a memory location, while the embodiment of FIG. 2a may not have to store all the captured images in a memory location, as some of them may be discarded.

Figure 3:
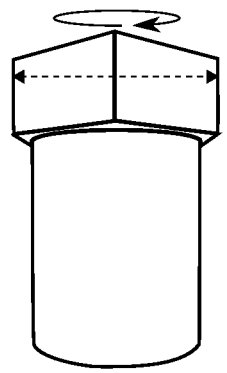
FIG. 3 illustrates the relation between sample container orientation and diameter of the cap.

FIG. 3 illustrates the dependency between the orientation of the sample container 10 relative to the camera 50 and the estimated diameter of the cap 11 of the sample container 10 based on captured images(s) by the camera 50 of the sample container 10. That is, an image of the sample container 10 can be captured by the camera 50. As will become obvious on the description of the following figures (for example FIG. 4), a diameter of the sample container 10, preferably of the cap 11, can be estimated by processing images of the sample container 10 captured by camera 50. A non-circular shape, such as a hexagon, comprises multiple diameters (or diagonals). Based on this rationale, it can be obvious that depending on the side of the sample container 10 facing the camera 50, more precisely, depending on the side of the cap 11 facing the camera 50, a different diameter of the cap 11 can be observed by the camera 50 and estimated. This is illustrated by FIGS. 3a to 3f.

FIG. 3a depicts a sample container 10 comprising a body 13 enclosing a cavity of the sample container 10, a cap 11 that can enclose a top opening of the body 13, an identification label 15 and markers 12R, 12L (discussed in more detail in FIG. 1). FIG. 3a can depict the sample container 10 in an initial position, which can be denoted as comprising a 0° orientation with respect to the initial position (since it is the initial position). Based on a method that will become obvious in the description of FIG. 4, a diameter of the cap 11 can be estimated, which in FIG. 3a is depicted as $d_1$.

Similarly, in FIGS. 3b, 3c, 3d and 3e the sample container 10 is depicted in different orientations with respect to the initial positions. More specifically, in FIG. 3b the sample container 10 is rotated 20° in a clock-wise direction with respect to the initial position and diameter $d_2$ can be an estimation of the diameter of the cap 11, as seen on an image of the sample container 10 put in this orientation. In FIG. 3c the sample container 10 is rotated 45° in a clock-wise direction with respect to the initial position and diameter $d_3$ can be an estimation of the diameter of the cap 11, as seen on an image of the sample container 10 put in this orientation. In FIG. 3d the sample container 10 is rotated 90° in a clock-wise direction with respect to the initial position and diameter $d_4$ can be an estimation of the diameter of the cap 11, as seen on an image of the sample container 10 put in this orientation. In FIG. 3e the sample container 10 is rotated 180° in a clock-wise direction with respect to the initial position and diameter $d_5$ can be an estimation of the diameter of the cap 11, as seen on an image of the sample container 10 put in this orientation. FIG. 3f, on the other hand depicts all the upper-mentioned estimated cap diameters, aligned according to one of their edges, such that, a comparison of their length can be facilitated.

Figure 5A:
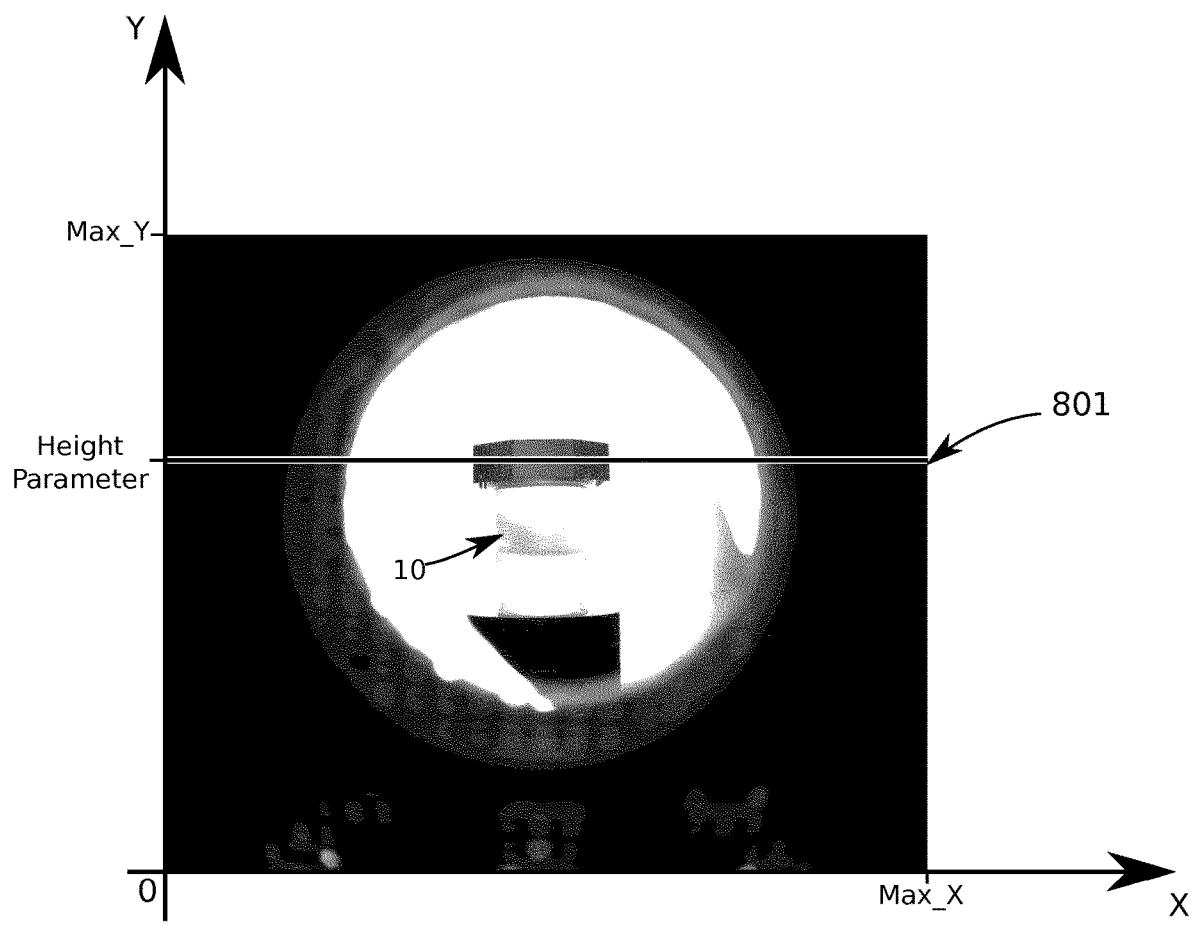
FIGS. 5a, 5b, 5c provide illustrations of a method for estimating a diameter of the sample container using an image line profile operation on an image of the sample container.
Figure 5B:
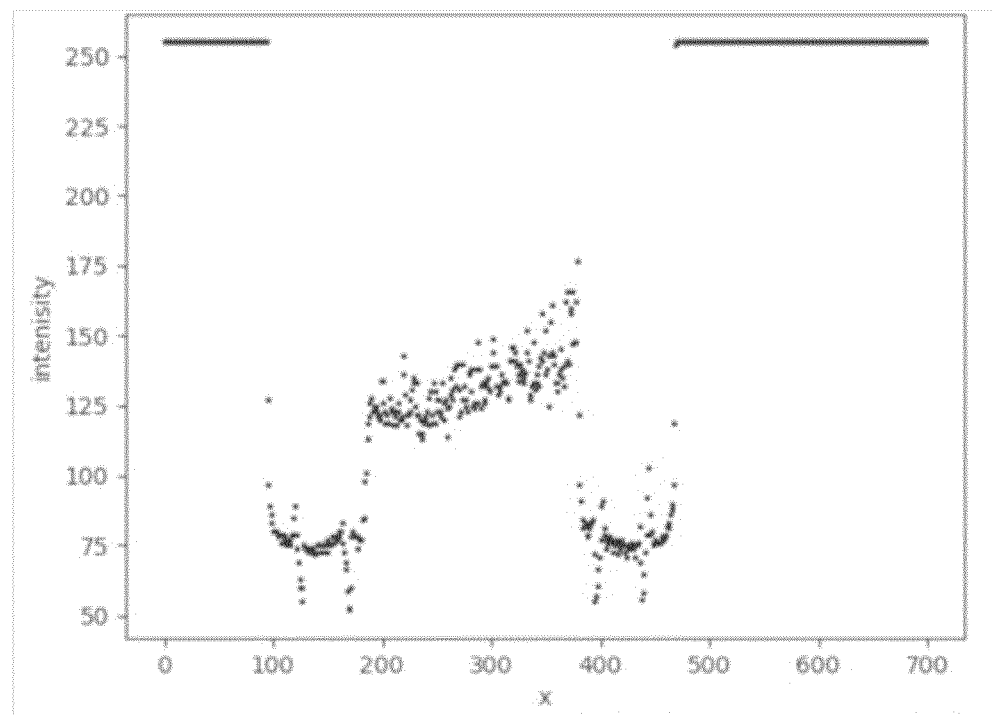
Figure 5C:
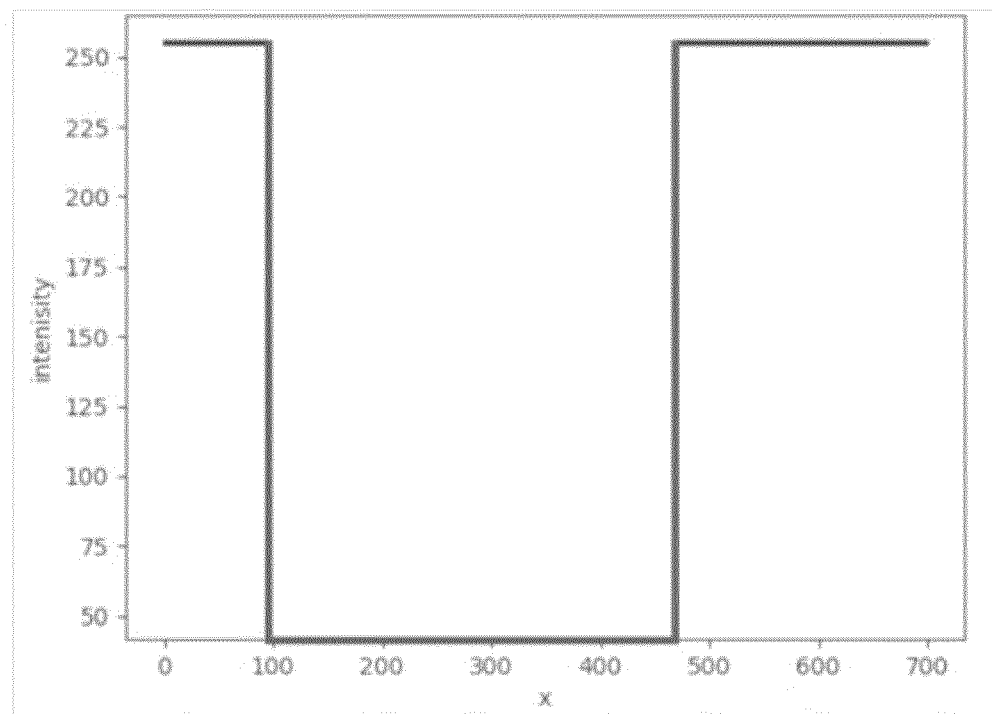

As it will become more obvious in the description of the following figures, a diameter of the cap 11 (such as, $d_1$, $d_2$, $d_3$, $d_4$, $d_5$), can be estimated based on an image of the cap 11, by calculating the distance between a left boundary and a right boundary that separate the cap 11 from the background of the image (see FIGS. 5a, 5b and 5c). However, while the sample container 10 changes orientation (i.e. rotates) with respect to the camera 50 and also based on the shape of the cap 11, the left and the right boundaries of the sample container 10 can shift to the right or to the left, allowing for different diameters of the cap 11 to be estimated. For example, in FIG. 3 the cap 11 is a 6-sided polygon, such as a hexagon (as seen from a top view). The boundaries separating the cap 11 and the background in this specific embodiment can be represented by the lateral edges of the cap 11. Thus, the estimated diameters can represent the distance between lateral edges. It can be noticed that in FIGS. 3a, 3c and 3d, the diameters represent the distance between different pairs of edges—thus it can be expected that such diameters are different. Furthermore, even in instances wherein two diameters can represent the distance between the same pair of edges, because of perspective, they can comprise different lengths. For example, note in FIGS. 3a and 3b that $d_1$ and $d_2$ comprise their endpoints in the same pair of edges of the cap 11. However, the orientation of the cap 11 with respect to the camera 50 in FIG. 3a, arranges $d_1$ to be perpendicular with the optical axis of the camera 50, which is not the case for $d_2$. Thus, $d_1$ and $d_2$ can comprise different lengths—though they end at the same pair of edges. However, in some cases the diameters can end on the same pair of edges and can have the same orientation with respect to the camera, for example diameters $d_1$ and $d_5$, in FIGS. 3a and 3e. In such cases, the diameters can be the same as it can be seen in FIG. 3f.

In general, different orientations of the sample container 10 can affect the estimated cap diameter—which represent the distance between a left boundary and a right boundary of the cap 11 with the background. In addition, also the shape of the cap 11 can affect the estimated cap diameter. In a preferred embodiment the cap 11 comprises a non-circular shape, such that it can comprise at least one distinct diameter from the other diameters. Said distinct diameter can be associated with an advantageous orientation of the sample container 10 and can also be referred as an advantageous diameter. That is, the shape of the cap 11 can be configured such that, when the sample container 10 is oriented in an advantageous orientation, a distinct diameter of the cap 11 can be estimated. In addition, the process of estimating the diameter of the cap 11 may be associated with errors (i.e. deviations around the exact diameter as calculated in a non-erroneous process). However, some of said errors can be tolerable or negligible. Thus, in some instance the advantageous orientation can be associated with an advantageous diameter range.

Figure 4:
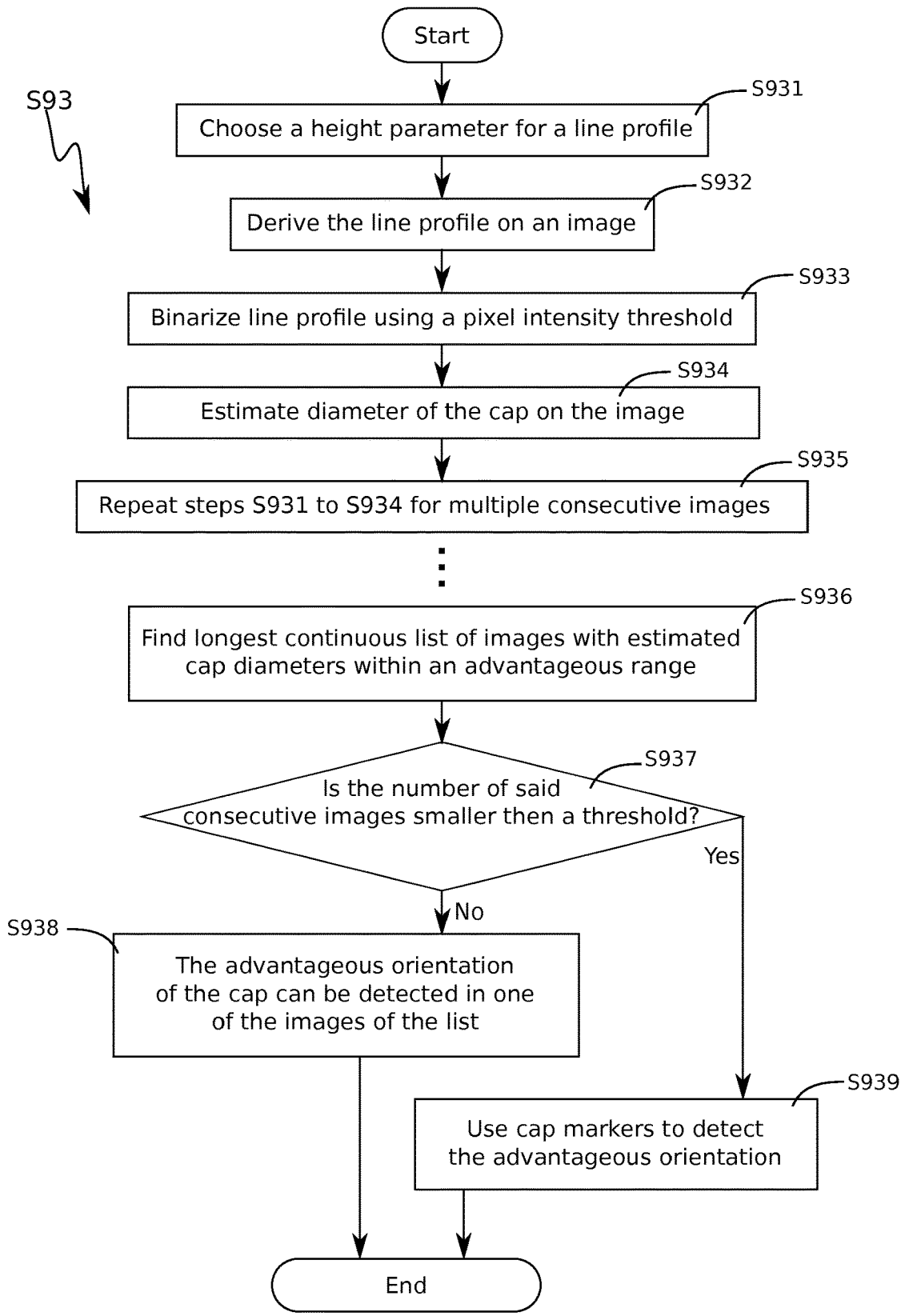
FIG. 4 depicts a flowchart of a method configured for detecting an advantageous orientation of a sample container.

In FIG. 4, a flowchart depicting a detailed description of an advantageous orientation detection process is provided. That is, step S93 (refer to FIG. 2) is provided herein in FIG. 4 in further details according to an embodiment of the present invention. Before proceeding with the description of the steps of the advantageous orientation detection process S93, firstly a general description of such process will be provided.

The advantageous orientation detection process S93 can be configured to detect a predefined orientation of the sample container 10, which can also be referred as an advantageous orientation. As discussed, the sample container 10 can be put on the container base 132 of system 1 (refer to FIG. 1). Furthermore, a motor 30 can be configured to rotate, with an angle and direction as provided by the data processing device 20, the container base 132 and thus the sample container 10. Hence, the sample container 10 can be in different orientations relative to the initial position. For example, if the angle of rotation is kept constant, e.g. 3.6°, then in a first rotary movement the sample container 10 can be oriented 3.6°, relative to the initial position, then in a second rotary movement 7.2°, then in a third rotary movement 10.8° and so on. At least one of such orientations can be an advantageous orientation. An advantageous orientation can be an orientation of the sample container 10 relative to the field of view of the camera 50, such that:

the camera 50 can "see" (i.e. capture an image of) the identification label 15 of the sample container 10, which can facilitate the identification label detection step S91 (see FIG. 2); and/or the camera 50 can "see" (i.e. capture an image of) the specimens contained in the sample container 10, which can facilitate the tissue detection step S95 (see FIG. 2); and/or the advantageous orientation can facilitate the automation of a process that handles the sample container 10 (e.g. in a laboratory), such as automatically removing the cap 11 from the sample container 10 (i.e. opening the top-opening of the body 13 of the sample container 10) and/or inserting the cap 11 to the sample container 10 (i.e. closing the top opening of the body 13 of the sample container 10).

As mentioned, the advantageous orientation can facilitate the automation of a process that handles the sample container 10. For example, the sample container 10 can be put on the container base 132 of system 1 for identification label detection, tissue detection and/or advantageous orientation detection processes, as discussed. Note that the sample container 10 can be put in the container base 132 in any orientation relative to the camera 50. However, after system 1 can finish all the processes, the sample container 10 can be removed from the container base 132. The removal of the sample container 10 from the container base 132 can be done by a human user. In such cases, the sample container 10 can be in any orientation and the human user can be able to grab and remove the sample container 10 from the base container 132. However, the removal of the sample container 10 can also be automated, e.g. a robotic arm or device can be configured to grab and remove the sample container 10 from the container base 132 and can pass it to another stage or apparatus for further analysis and handling of the sample container 10. To facilitate such automation, it can be advantageous to orient the sample container 10, such that, it can be grabbed and removed from the container base 132. For example, a robotic arm can be usually limited to grab objects with certain shapes or sizes, more precisely, objects comprising shapes and sizes according to which the robotic arm was constructed and/or trained to grab. Thus, it can be advantageous that the sample container 10 can be put in a certain orientation, such that, it can be grabbed and removed from the container base 132, preferably in an automated manner, e.g. by a robotic arm.

The following steps, relate to an advantageous orientation detection process S93. They provide a manner of detecting when the sample container can be in the advantageous orientation, based on known parameters of the sample container 10, such as, the diameter of the cap 11, the distance or ratio of the distances between the markers 12 of the sample container 10. The advantageous orientation detection process first estimates the diameter of the cap 11 of the sample container 10, based on an image of the sample container 10 and then determines for a way of estimating the required cap orientation.

In step S931, the advantageous orientation detection process comprises choosing a height parameter wherein a line profile can be derived. The height parameter can determine at what distance from the base of the image the line profile can be derived. The height (or the distance from the base) can be measured according to the y-axis direction of a reference system as depicted in FIG. 5a. Referring to FIG. 5a, the height can thus be a number between 0 and Max_Y, expressed in a distance unit or number of pixels, preferably the latter one.

In step S932 the line profile can be derived on an image. To derive the line profile first the pixels positioned at the same height, i.e. comprising the same y-coordinate (refer to FIG. 5a), are considered—thus forming a line (hence the name line profile). Then, the intensity level of these pixels can be obtained from the data of the image. In other words, to each pixel on the line (i.e. comprising the same y-coordinate) the respective intensity is extracted based on the data of the image. The intensity levels of each pixel on the line can be plotted in a diagram, such as the diagram of FIG. 5b.

In step S933, the intensity values obtained can be binarized using threshold value. The binarization of the intensity values in the line profile can map the intensity values in two states, which usually can be denoted as "0" or "1". Mapping can be done using comparison of the respective intensity level with a threshold value. The comparison can have three possible outcomes: the intensity is either smaller, equal or larger than the threshold value. Since, the binarization comprises only two states ("0" or "1"), two of the outcomes of the comparison need to be grouped together. Preferably, the smaller then threshold outcome can be mapped to one of the states (e.g. "0"), the larger then the threshold outcome to the other binary state (e.g. "1") and the equal to the threshold outcome, can be chosen in advance to map either state "1" or state "0". In some cases, when the equal outcome of the comparison is encountered a random decision can be taken to assign it to one of the binary states. The binarization can be advantageous as it can facilitate the estimation of the diameter of the cap 11 of the sample container 10.

In step S934 the diameter of the cap can be determined. The diameter of the cap 11 of the sample container 10 can be determined by differentiating on the image, more specifically on the derived line profile, which of the pixels belong to the cap 11 and which to the background. This can be facilitated by choosing the color of the background to have a high contrast relative to the color of the cap 11. A further facilitation step can be capturing grayscale images (or transforming a colored image into a grayscale image) for easy processing. Note, that in a gray scale image, each pixel comprises only one parameter depicting the brightness value of this pixel. The value of this parameter can depend on the pixel format that is used, for example if the parameter is stored in an 8-bit integer then it can range between 0 and 255, wherein 0 is usually defined to be totally black and 255 to be totally white.

For example, the cap 11 can be rather dark or black and the background can be more bright or white or vice-versa. Thus, it can be expected that pixels representing the cap 11 comprise intensity levels that are small (i.e. closer to 0, black) and the background pixels comprise high intensity values (i.e. closer to 255, white). Hence the binarization of the line profile in step S933, using a threshold value (such as 250) can differentiate the pixels belonging to the background and the pixels belonging to the cap 11, by assigning them different states. For example, if the background is white and the cap 11 is black, any pixel in the line profile with an intensity higher than or equal to 250 (i.e. the chosen threshold value) can be assigned to the background and any pixel in the line profile with an intensity smaller than 250 can be assigned to the cap 11. By counting the pixels on the line profile that belong to the binary state representing the cap 11 the diameter of the cap 11 can be estimated in number of pixels. Knowing the size of each pixel, the diameter can then be expressed in distance units.

Steps S931 to S934 are illustrated in the example provided in FIGS. 5a to 5c. Referring to FIG. 5a an exemplary image of a sample 10 is depicted. Each pixel of the image comprises a unique pair of (x, y) coordinates based on the depicted coordinative system provided in FIG. 5a, wherein the x-coordinate can be between 0 and Max_X and the y-coordinate can be between 0 and Max_Y. The value of Max_X and Max_Y can depend on the size of the image. For example, for an image of size 800×800, the Max_X is 800 and the Max_Y is 800 and for an image of the size 2448×2048 (i.e. the width is 2448 pixel and height is 2048 pixel), the Max_Y is 2448 and the Max_X is 2048. To put it simply, the Max_X can determine how many vertical lines of pixels the image comprises in a row one after the other in the x-direction and the Max_Y can determine how many horizontal pixel lines the image comprises stacked one above the other in the y-direction.

A height parameter can be determined, wherein a line profile can be derived. As it can be noticed, the height parameter can be a value between 0 and Max_Y.

The height parameter determines a line 801 comprising all the pixels with coordinates (x, Height Parameter), wherein x can be any number from 0 to Max_X and the y-coordinate is fixed to the height parameter. In other words, any point on the line profile can comprise an abscissa from 0 to Max_X and ordinate equal to the chosen height parameter. Note that, two distinct pixels in the line profile derived according to the height parameter as discussed comprise different abscissas.

The intensity of the pixels on this line can be plotted as depicted in FIG. 5b. The horizontal axis of the diagram of FIG. 5b comprises the x-coordinate values (i.e. the abscissas) and the vertical axis comprises the intensity values. For example, from FIGS. 5a and 5b it can be noticed that the pixel of the image with the coordinates (0, Height Parameter), comprises an intensity of 255.

In FIG. 5c the intensity values are binarized, by comparing them to a threshold value. In the provided example, the threshold value is 250. In this example, intensity values higher than or equal to the threshold value are assigned to binary state "0". Otherwise they are assigned to binary state "1". Note that other assignments can be used too. Since the background and the cap 11 of the sample container 10 comprise contrasting colors (see the image on FIG. 5a) it can be expected that the background and the cap 11 comprise pixel intensities that will fall in different states. In this example, the background pixel comprises intensities that are expected to fall under state "0" and the pixels representing the cap are expected to have intensity values in the binary state "1". By counting the number of pixels that fall in state "1" (which was assigned to the cap pixel intensity values) the diameter of the cap can be estimated.

Thus, through steps S1931 to S934 (refer to FIG. 4) illustrated by example in FIGS. 5a to 5c, a method of estimating the diameter of a cap 11 of a sample container 10, based on a single image of the sample container 10 was described. In the following paragraphs, the method is further configured to increase accuracy of the estimated diameter based on more than one image.

Referring back to FIG. 4, the advantageous orientation detection process S93, can further comprise keeping track of the maximum number of consecutive images wherein diameters differing by less than a tolerable deviation was determined. That is, through steps S931 to S934 a diameter of the cap 11 of the sample container 10 on a single image can be estimated. However, due to artifacts (refer to FIG. 6) the estimation can be erroneous. Thus, more correct results can be produced if more than one image is considered. In other words, steps S931 to S934 can be executed for each captured image of the sample container 10, as depicted in step S935. As discussed, the images are captured after rotating the sample container 10. Thus, consecutive images of the sample containers relate to similar (differing by a small angle) orientations of the sample container 10. Following this rationale, it can be expected then on consecutive images the estimated diameter of the cap 11 can be similar, or at least can be within a tolerable deviation, also referred as an advantageous range.

To put it simply, an image of the sample container 10 can be captured. Based on this image a diameter of the cap 11 of the sample container 10 can be estimated. The estimated diameter is compared to a known diameter of the cap 11 (i.e. the diameter of the cap 11 can be measured in advance by a measuring tool or can be provided as a parameter from the manufacturer of the cap 11).

Note that the cap 11, unless its circular, may comprise multiple distinct diameters, and the estimated diameter through steps S931 to S934 can depend on the orientation of the cap 11 (as discussed in more detail in FIG. 3). For example, the cap 11 can be a rectangle with edges a and b (a and b can represent the length of the edges). When edge a is directly facing the camera 50 then the diameter as estimated by steps S931 to S934 based on a single image is expected to be similar to a. Similarly, when edge b is directly facing the camera 50 then the diameter as estimated by steps S931 to S934 based on a single image is expected to be close to b. When one of the vertices is directly facing the camera 50 then the diameter as estimated by steps S931 to S934 based on a single image is expected to be close to the diagonal of the rectangle, i.e. $\sqrt{(a^2+b^2)}$. The same analogy can be made if the cap 11 comprises a different shape, with 3 or more vertices. Thus, unless the cap 11 comprises a circular shape, there can be cases when for two distinct orientations of the cap 11 relative to the camera 50, different diameters of the cap 11 can be estimated by steps S931 to S934 based on a single image (as discussed in more detail in FIG. 3). Thus, in an advantageous orientation of the sample container 10 relative to the camera 50, a specific side (or sides in case of multiple advantageous orientations) is faced directly to the camera 50, and thus a specific diameter of the cap 11 is expected to be estimated, in order to determine an advantageous orientation. This diameter can be measured in advance by a measuring tool or can be provided as a parameter from the manufacturer of the cap 11) and can be provided as a parameter to the advantageous orientation detection process S93.

A tolerable deviation can be used, resulting in a range around the known diameter of the cap 11. Thus, if the estimation of the diameter of the cap falls within this range, then it can be inferred that the orientation can plausibly be an advantageous orientation. Otherwise it can be inferred that the respective orientation cannot be an advantageous orientation.

As discussed, steps S931 to S934 can be repeated for multiple consecutive images, e.g. for each of the captured images. Thus, for each image a diameter of the cap can be estimated. In step S936, the algorithm can find the longest continuous list of images with estimated cap diameters within an advantageous range (for examples of said list refer to FIG. 7a and FIG. 7b). In some embodiments, if the estimation of the diameter of the cap as estimated by steps S931 to S934 based on a single image (i-th image) falls within said advantageous range it can be appended in a list comprising the index (i.e. number i) of the captured image and the estimated diameter. When estimating the diameter for the next (i.e. i+1) image, if it is within the advantageous range it will be appended to said list. When an estimation does not fall within the advantageous range, then no more appends are done to the list. The list can be stored in a memory location and another list can be started for other estimated diameters that may fall within the tolerable range.

In other words, a plurality of lists can be created, wherein each list can comprise the index and the estimated diameter of consecutive images wherein the diameter of the cap was estimated to be within the advantageous deviation. Furthermore, the list may comprise only consecutive images, i.e. images captured one after the other, without disruption. Among these lists, the longest list can be selected, based on the rationale that the longer the number of consecutive images wherein the diameter of the cap was estimated within the advantageous range, the higher the probability that the advantageous orientation corresponds to one of these images.

Having obtained the longest list with consecutive images wherein a diameter smaller than an advantageous range was estimated, the method can proceed to step S937. Step S937 is a decision step, wherein the length of the said list is compared to a threshold length. As discussed, the longer the list (i.e. the larger the number of consecutive images wherein a diameter within the advantageous range was estimated) the higher the probability that the advantageous position lies within the images on the list. Thus, a minimum length of list can be defined that comprises the least number of consecutive images with similar diameter of the cap 11 to the diameter of the cap 11 when the sample container is oriented according to the advantageous orientation. If the length of the list is not smaller than the threshold value then the method follows the "No" path into step S938. In step S938, it can be inferred that in one of the images comprised in the found longest list the sample container 10 was positioned in an advantageous orientation. Thus, the advantageous orientation can be found in the said list. Otherwise, the method follows the "Yes" path into step S939 wherein the advantageous orientation can be found based in the cap markers 11.

Figure 6:
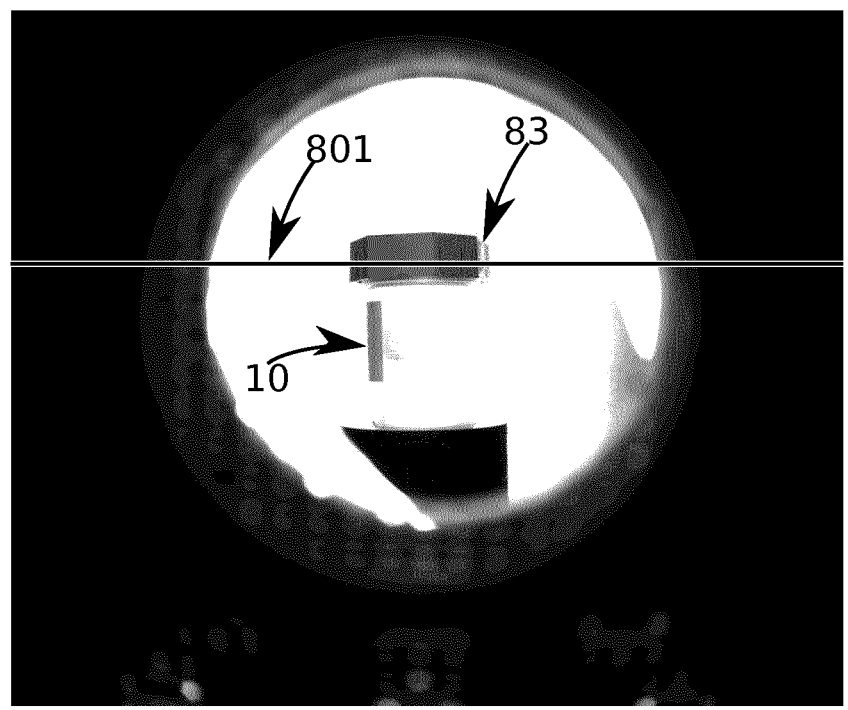
FIG. 6 provide an illustration of a hazardous scenario wherein artefacts can increase the error of estimating a diameter of the sample container.

In FIG. 6 a hazardous scenario wherein, artifacts may produce errors to the estimation of the cap diameter is depicted. In FIG. 6 an exemplary image of the sample container 10 is depicted. The line profile 801 can be derived in the image for estimating the diameter of the cap 11. However, due to reflections 83, the estimation may be prone to errors. For example, the reflection 83 increases the brightness of the cap 11 on that region, which can cause the algorithm to recognize the reflected region as part of the white background rather than part of the cap 11. To cope with such errors, based on the rationale that probability of the same artifact, such as reflection 83, to happen in multiple consecutive images is lower than the reflection happening in one single image, multiple consecutive images are considered when estimating the diameter of the cap 11 (refer to step S936 in FIG. 4).

That is, in some instance, a method that finds the closest estimated cap diameter to the advantageous diameter can be used. That is, for each captured image a diameter is estimated, as discussed in FIG. 4, and the best estimation is chosen among them. However, due to artifacts 83 the estimation may be prone to errors, and thus even though the sample container 10 was not in an advantageous orientation, a diameter similar to the advantageous diameter was estimated. Thus, to make the process of finding the advantageous orientation more robust, the longest continuous list of images with estimated cap diameters within the advantageous range (step S936 in FIG. 4) can be considered. Additionally, a threshold length can be set for the length of said list. If the length of said list is not below the set threshold length then it can be inferred that the advantageous orientation lies in one of the images in the list (step S938 in FIG. 4), which will be described in more detail in relation to FIGS. 7a and 7b. If the length of the list is smaller than the threshold length, then it can be inferred that the results obtained by estimating the diameter of the cap can be inconclusive, thus another manner of finding the advantageous orientation should be used. As will be described in more detail in FIG. 8, the cap marker 12L and 12R can be used.

Figure 7A:
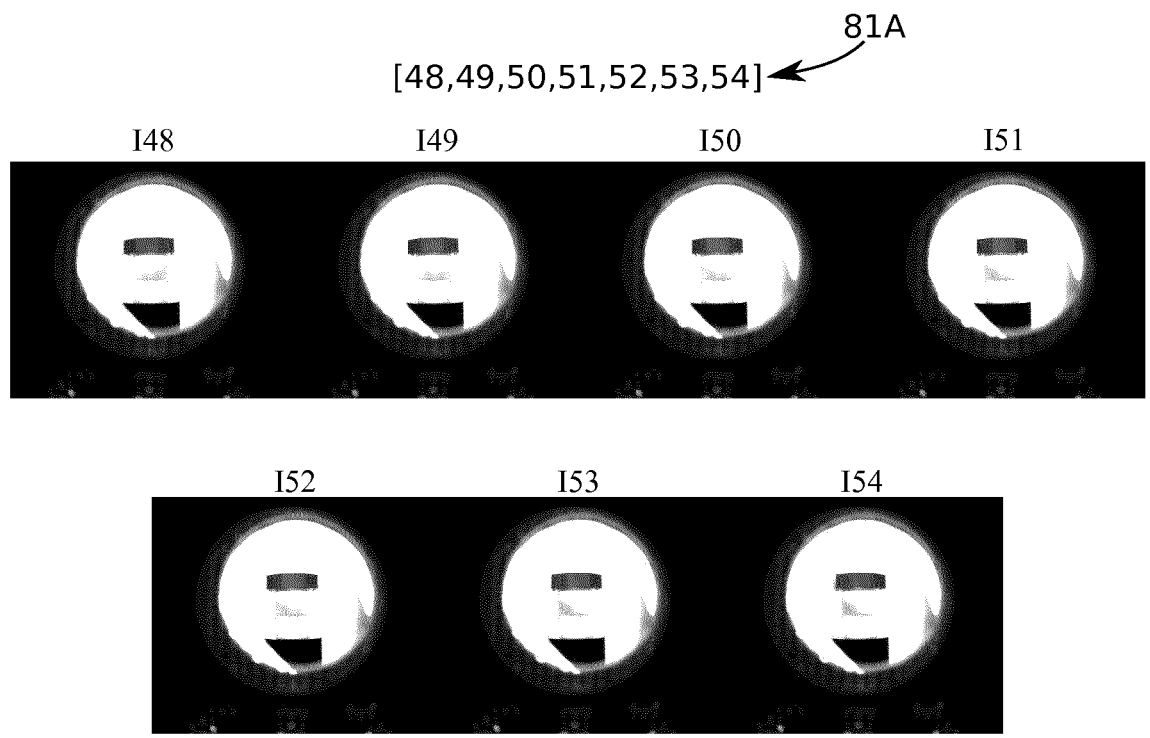
FIGS. 7a, 7b provide illustrations of a method for detecting an advantageous orientation based on longest list of consecutive images wherein diameters of the sample container within an advantageous range were estimated.
Figure 7B:
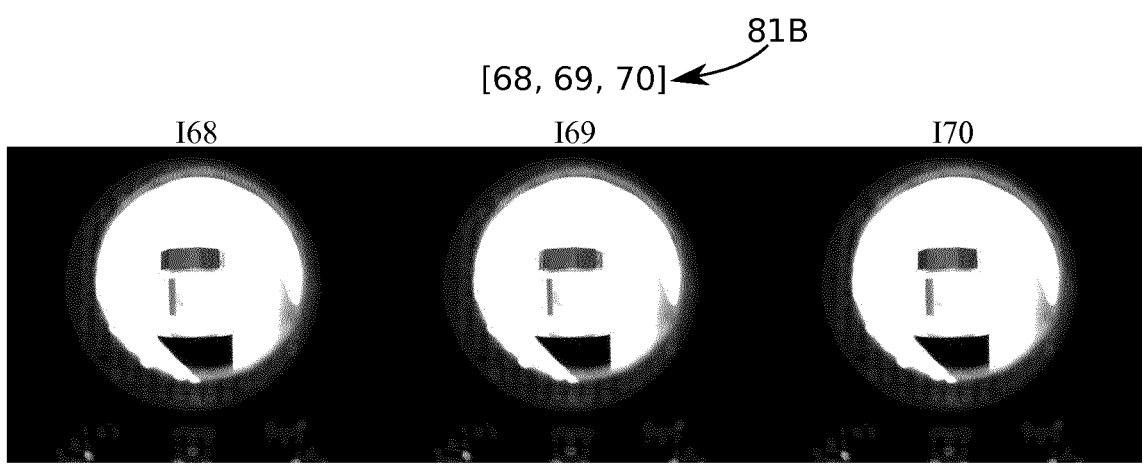

In FIGS. 7a and 7b exemplary longest continuous list of images with estimated cap diameters within an advantageous range are provided. As discussed, for different operative reasons it may be required to orient the sample container 10 in an advantageous orientation. Furthermore, when the sample container 10 can be oriented according to the advantageous orientation a distinct diameter of the cap 11 can be estimated, referred as the advantageous diameter. In other words, an advantageous cap diameter can be associated to the advantageous orientation, such that whenever the cap diameter is estimated to be equal to the advantageous diameter it can be inferred that the sample container 10 is oriented in the advantageous orientation. In some embodiments, a deviation from the advantageous diameter can be tolerated, thus, an advantageous diameter range can be associated to the advantageous position instead. In such embodiments, whenever the diameter of the cap 11 can be estimated to within the advantageous range it can be inferred that the sample container 10 can be in the advantageous orientation.

As discussed in FIGS. 4, 5a, 5b and 5c the diameter of the cap 11 can be estimated based on captured images of the sample container 10. Furthermore, each image of the sample container 10 can be captured by the camera 50 (see FIG. 1), after (or before) each rotation of the sample container 10, wherein the rotation of the sample container 10 can be done by the motor 30 (see FIG. 1). In other words, a plurality of images of the sample container 10 can be captured, such that, in each image the sample container is in a distinct orientation with respect to the camera—i.e. a sample container orientation can be associated to an image.

Thus, the advantageous orientation can be found by estimating the diameter of the cap 11 on the captured images of the sample container, comparing the estimated diameter to the advantageous range (which can be a parameter known in advance) and if the estimated diameter falls within the advantageous range, then it can be inferred that the orientation of the sample container 10 on the image wherein said diameter of the cap 11 was estimated can be an advantageous orientation. However, due to artifacts (discussed in FIG. 6), determining the advantageous orientation based on a single image can be erroneous. Thus, lists of consecutive images can be used instead, more precisely the longest list of consecutive images, wherein for each of them the estimated diameter of the cap 11 falls within the advantageous range.

In FIG. 7a and FIG. 7b, two exemplary lists 81A and 81B are provided. List 81A comprises the images with indexes from 48 to 54 and list 81B comprises the images with indexes from 68 to 69. The index of an image, in a preferred embodiment, can depict the position of the image based on the order the images were captured. For example, image I49 (i.e. image with index 49) can be the $49^{th}$ captured image of the sample container 10. If the rotation steps of the sample container where constant (e.g. 3.6°), one can calculate at what orientation the sample container 10 can be relative to the initial position, by multiplying the index of the image with the constant rotation step (e.g. 49·3.6°=176.4° is the sample container 10 rotated relative to the initial position). This can facilitate keeping track of the orientations of the sample container 10 on each image.

In the images of lists 81A and 81B, a diameter of the cap 11 was estimated to be within the advantageous range—that is why they are included in the list. It can also be noticed that the indexes on each list are continuous—i.e. images on each list are consecutive images. However, list 81B is not continuous to list 81A (i.e. I54 and I68 are not consecutive images)—otherwise they can form a single list.

In addition, it can be noticed that list 81A is longer than list 81B—list 81A comprises seven consecutive images and list 81B comprises 3 consecutive images. It can be inferred that the position of the sample container 10 when the images I49 to I54 of list 81A were captured, can comprise a higher probability of representing the advantageous orientation than the images I68 to I70 of the list 81B. For example, there is a higher chance for artifacts (see FIG. 6) to provide erroneous cap diameter estimation on three images than on 7 images. Thus, only list 81A can be considered for finding the advantageous orientation. In other words, the longest list comprising consecutive images wherein the diameter of the cap 11 was estimated to be within the advantageous range can be considered for finding the advantageous orientation within the images of the list. In the example of FIGS. 7a and 7b, list 81A represent the longest list.

In a next step, the length of the longest list can be checked against a threshold. For example, a list of 2 consecutive image can represent the longest list, however the results may be erroneous due to artifacts. Thus, usually a threshold length of images, such as 3-5 consecutive images, can be advantageous to use.

If the length of the list 81A (which is seven) is larger than the threshold length—then it can be inferred that the advantageous orientation can be in one of the images of the list 81A. As the sample container 10 rotates and images are captured, the orientation of the sample container 10 first approaches the advantageous orientation, reaches it (within a deviation) and leaves the advantageous orientation. Based on this rationale, in the list 81A the orientation of the sample container 10 approaches the advantageous orientation starting from image I48, reaches it in the middle of the list 81A and leaves the advantageous orientation on the last image I54 of the list 81A. Thus, it can be less erroneous to choose the middle image of the longest list 81A as the image where the sample container 10 was in the advantageous orientation, in this case image I51. In addition, if the rotation step is constant (e.g. 3.6°) the angle of rotation relative to the initial position can be calculated, in this example, 51·3.6°=183.6°. Thus, when it can be required to orient the sample container 10 in an advantageous orientation, the data processing device 20 (see FIG. 1) can use the found angle of rotation to trigger the motor to rotate the sample container 10—in the provided example the data processing device 20 can trigger the motor 30 to rotate the sample container 10 by 183.6° relative to the initial position.

Thus, if the longest list of consecutive images wherein a diameter within the advantageous range was estimated, comprises a length larger than the threshold value the advantageous orientation can be found on one of the images of said list. However, if the longest list of consecutive images wherein a diameter within the advantageous range was estimated, comprises a length not larger than the threshold than the threshold value then another manner of finding the advantageous position can be advantageous. The other method, as discussed in FIG. 4, step S939, determines the advantageous orientation based on cap markers 12.

FIG. 8 illustrates a method of detecting the advantageous orientation based on the markers 12 of the sample container 10 (see FIG. 1).

As discussed, the sample container 10 can comprise cap markers 12. The cap markers 12 can preferably be positioned in opposing sides of the vertical central axis of the cap 11—i.e. on the right 12R and left 12L of the central axis. In yet, a more preferable embodiment, such as the one depicted in FIG. 8h, the markers 12 can be symmetric with respect to the vertical central axis 1100. Two markers on each side can be provided. Thus, two markers 12L positioned in a distance A from each other and two markers 12R positioned in a distance C from each other can be provided. Distances A and C can be known parameters, e.g. they can be measured by a measuring tool. In addition, the distance between the left pair of markers 12L and right pair of markers 12R can be known, which can be represented by B—the distance between the inner markers from each pair.

In some embodiments, the markers 12, can preferably comprise a different color with respect to the color of the cap 11. In some further embodiments, the markers 12 can be gaps in the structure of the cap 11, as depicted in FIG. 8h. In a preferred embodiment, the marker 12 and the cap 11 can be configured such that a distinction between the two can be made, more preferably a distinction in an image of the sample container 10, between the pixels representing the cap 11 and the pixels representing the markers 12 can be made.

In addition, in a preferred embodiment, the distances A, B and C can be constant irrelevant from the height (i.e. direction according to the central axis 1100, also specified by the y-axis of the coordinative system given in FIG. 5a).

The method of using the markers 12 for determining if in an image the sample container 10 can be oriented in the advantageous orientation, can be facilitated by deriving a line profile on the image. That is, the detection of the advantageous orientation of the sample container 10 can be facilitated by deriving line profiles on the captured images. This step can be similar to the step S932 depicted in FIG. 4. In other words, a line profile can be derived on the image, then the intensities of the pixels on this line profile can be extracted (from the data of the image) and can be plotted against each pixel, more specifically against each x-coordinate of the pixels. For further details of this procedure refer to FIGS. 5a and 5b.

As discussed, the markers 12 and the cap 11 can be configured such that there can be a distinction between the pixels on an image of cap 11 and the pixels representing the markers 12. For example, the pixels that represent the markers 12 on the image can be brighter than the pixels representing the cap 11. Thus, the position of the markers 12 can be determined by depicting local minimums of the intensity values in the line profile. For example, in the depicted embodiment four markers 11 were provided, thus it can be expected that four local minimums can be found. A local minimum can be an intensity of a pixel in the line profile that is smaller than a threshold value. For example, in a scale of intensity value from 0 to 255, the threshold value can be a value from 60 to 75. The same analogy can be done if the pixels representing the markers 12 comprise higher intensity values then the pixels representing the cap 11. Instead, local maximums can be searched in the line profile.

The local minimums can be found by defining a bin 87 and detecting the pixel within this bin that comprises the smallest intensity which at the same time can be smaller than a threshold value. For example, the bin 87 can comprise a width of 35 pixels, meaning that 35 consecutive pixels on the line profile can be searched and the minimum among them can be considered. Said minimum can be compared to the threshold value and if it is below it than it can be considered as a local minima and information regarding it, such as the position, i.e. x-coordinate, and/or intensity value can be stored in a memory location.

This process is illustrated through FIGS. 8a to 8g. The bin 87 is used to search for local minimums. It can start from the beginning of the line profile and can slide towards the end of the line. While sliding the local minimums can be detected and stored, as discussed.

Figure 8A:
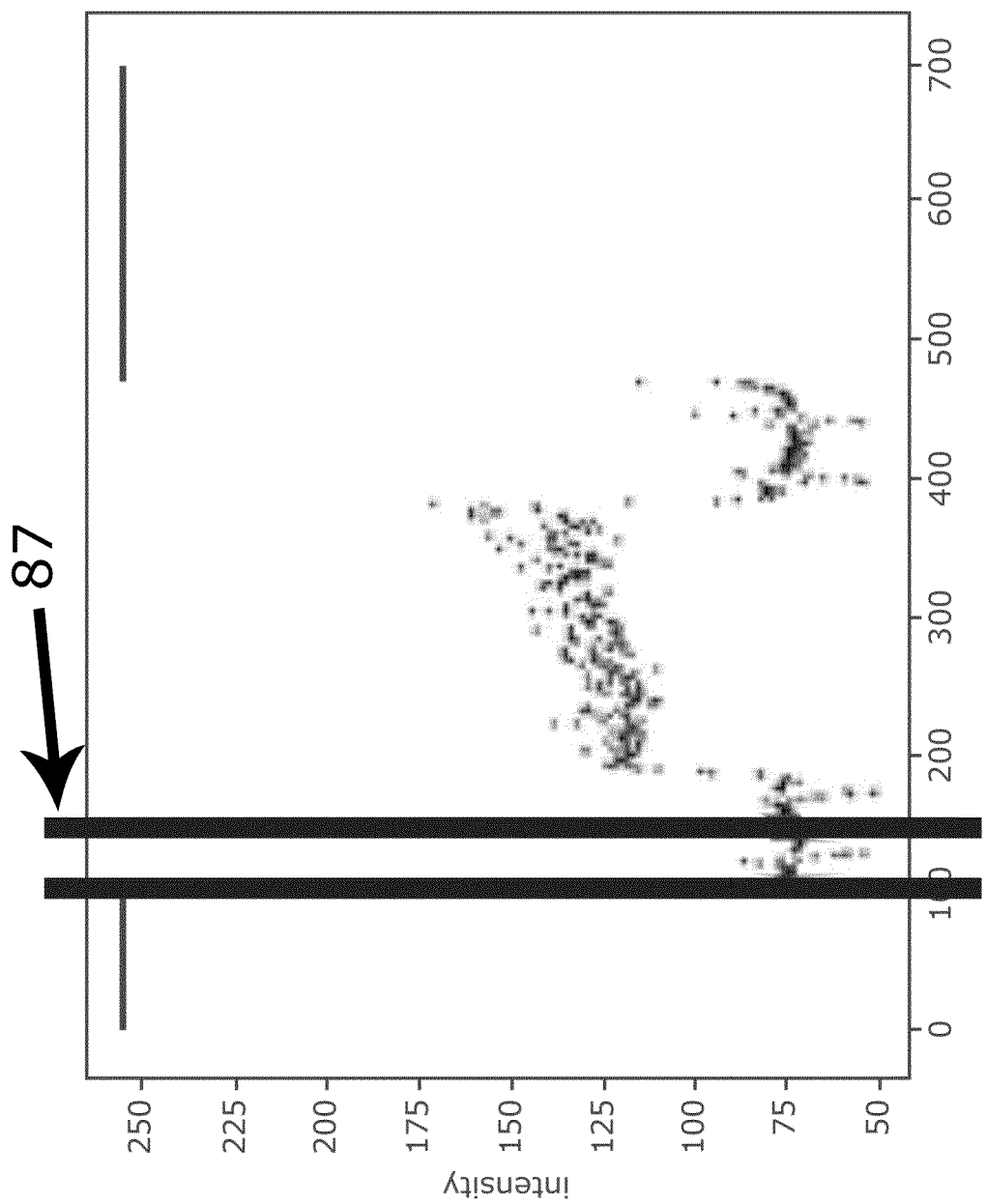
FIG. 8 provide illustrations of a method for estimating a diameter of the sample container using markers on the sample container.
Figure 8B:
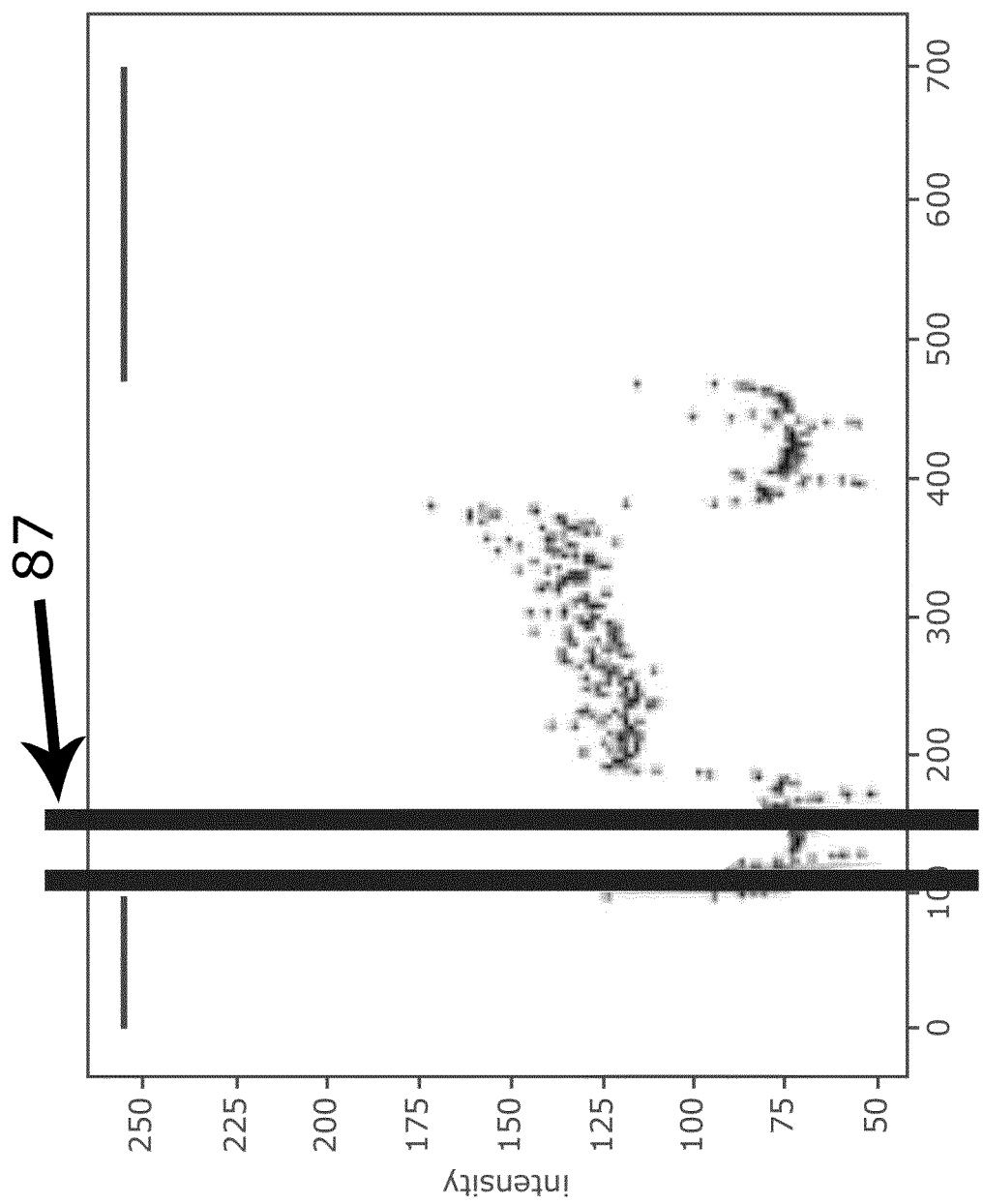
Figure 8F:
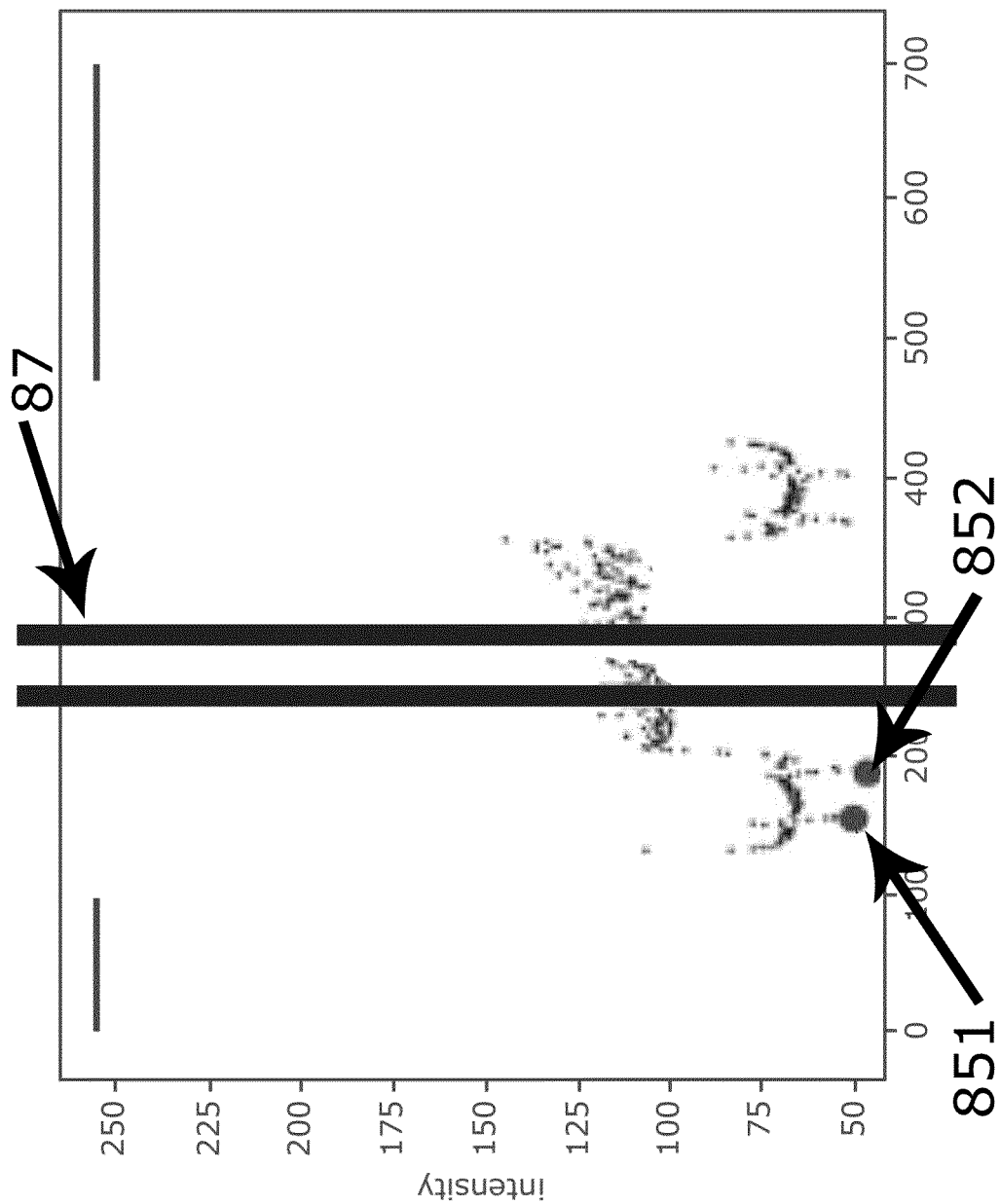
Figure 8G:
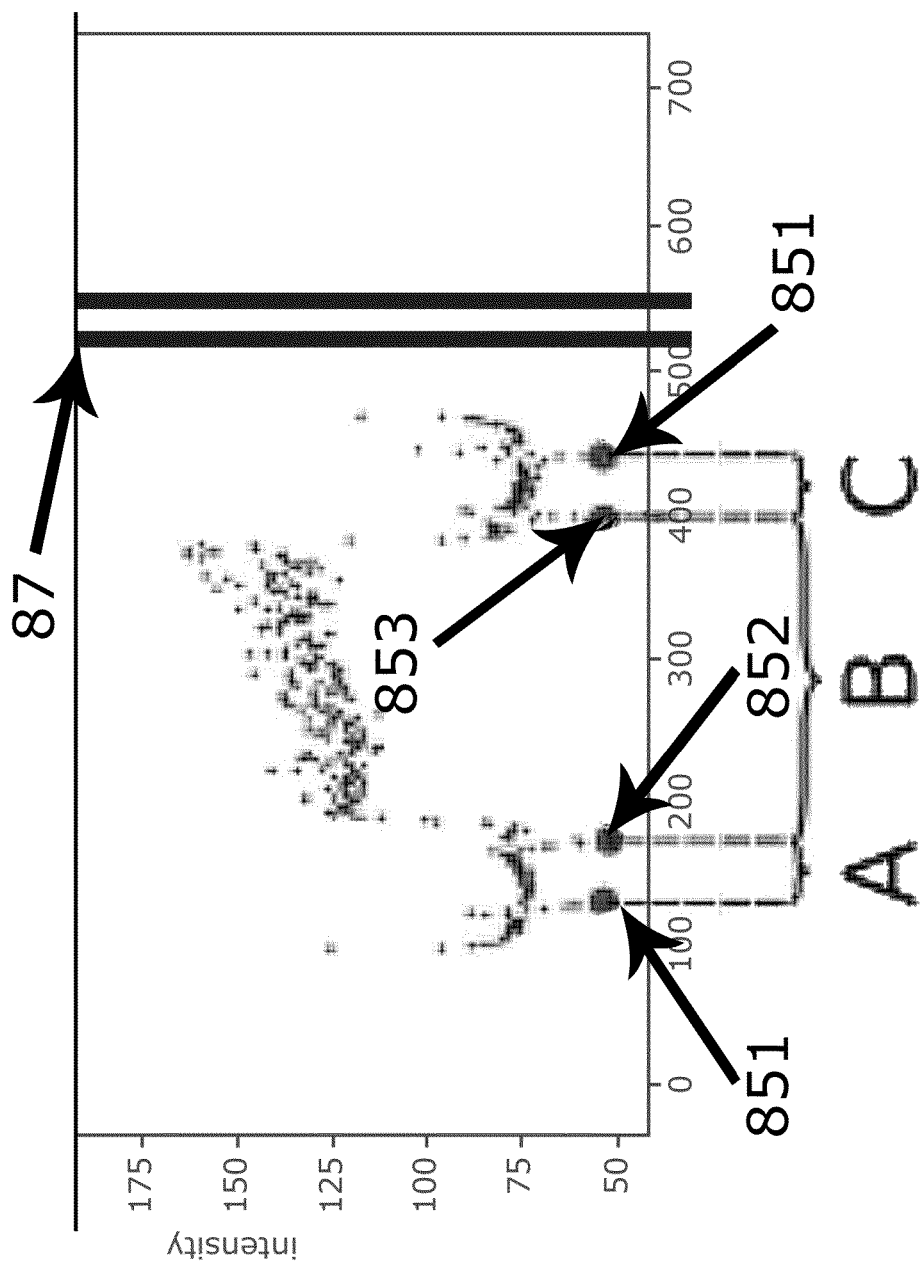

In FIG. 8c, the first local minima 851 is detected. In FIG. 8f, a second local minimum 852 is already detected. In FIG. 8g, the bin 87 is near the end of the line profile and four local minimums are detected, 851, 852, 853 and 854.

In some embodiments, if less than four minimums can be detected, or if the number of local minimums detected is less than the number of markers 12, the process may result unsuccessful. On the other hand, if more than four local minimums can be detected, or in general the number of local minimums can be more than the numbers of markers 12, in some embodiments the process may result unsuccessful. In some other embodiments, if more local minimums can be found than the number of markers 12 the extra local minimums can be discarded (i.e. the "n" smallest local minimums can be considered, wherein "n" represents the number of markers 12). In some embodiments, when the process of finding the local minimums results unsuccessful, an error can be reported. In some embodiments, new images of the sample container 10 can be obtained and processed as discussed above.

Further, the x-coordinates of each of the local minimums can be extracted and thus the distances A, B and C can be calculated. For example, distance A can be estimated by subtracting the x-coordinates of the local minimums 852 and 851. Distance B can be estimated by subtracting the x-coordinates of the local minimums 853 and 852. Distance C can be estimated by subtracting the x-coordinates of the local minimums 854 and 853. In addition, the length of such distances can be known in advance, for example, they can be measured by a measuring tool or can be provided by the manufacturer of the cap 12.

The markers 12 and the cap 11 can be configured such that, when the sample container 10 can be in an advantageous orientation, the markers 12 can be facing the camera 50 (see FIG. 1), such that distances A, B and C can be estimated. However, it can be noticed that not every time the distances A, B and C can be estimated an advantageous orientation of the sample container 10 is found. For example, referring to FIG. 3, in both FIGS. 3a and 3b, the markers 12 can appear on an image captured by the camera 50, thus, it can be expected that four local minimums can be detected in both of the images and as a consequence the distance A, B and C can be estimated. But, in FIGS. 3a and 3b the sample container is in two different orientations, as discussed with respect to FIG. 3.

Thus, it can be advantageous that whenever distances A, B and C can be estimated, they can be compared to the known values of said respective distances. In some embodiments, the values of the respective estimated and known distances can be compared. For example, the estimated value of A can be compared to the known value of A, the estimated value of B can be compared to the known value of B and the estimated value of C can be compared to the known value of C. If they are equal, or similar within a tolerable deviation range, then it can be inferred that the sample container 10 in the image wherein values A, B and C were estimated, can be oriented according to the advantageous orientation.

In a preferred embodiment, instead of comparing the absolute values of estimated and known values of A, B and C, their rations are compared. That is, AC can represent the ratio between A and C (i.e. distance A divided by distance C), AB can represent the ratio between A and B (i.e. distance A divided by distance B) and CB can represent the ration between C and B (i.e. distance C divided by distance B). Furthermore, since the real values of A, B and C can be known the real ratios can be calculated. The estimated ratios can then be compared to the real ratios. If the estimated ratios AB, AC and CB can be equal to or similar within a tolerable deviation range with the known values of respective ratios, then it can be inferred that the sample container 10 in the image wherein values A, B and C were estimated, can be oriented according to the advantageous orientation.

With respect to the following FIGS. 9 to 12 an embodiment according to the present invention, of a method for sample detection in a sample container 10 will be described. The method of sample detection, also referred as tissue detection, can be configured to detect the presence of at least one sample or specimen or tissue sample (also referred as tissue) that can be comprised in the cavity of the sample container 10. In addition, the method can be configured to determine the number of samples that can be comprised in the cavity of the sample container 10. Furthermore, the tissue detection method can be configured to estimate sample features such as, size and/or shape and/or volume and/or colors of the sample. Additionally, at least one feature of the sample comprised in the sample container 10 can be used to infer or estimate the type of sample.

A rationale after the tissue detection method is that if the sample container 10 is moved and stopped (i.e. sudden movement of the sample container 10), due to different densities the fluid (e.g. fixation liquids, formalin) and the samples (e.g. tissue) that can be inside the sample container 10 can rotate in different manners, such as, in different speeds and/or directions. Thus, the samples that can be inside the sample container 10 can be detected, for example, by detecting slow moving parts in a sequence of images of the sample container 10 that can be captured after the sudden movement of the sample container.

To facilitate the detection of the samples, the sample container 10 can be illuminated with light while the images are captured. Blue light has turned out to be a preferred choice. The reason for this, is that blue light can be absorbed better than white light by the samples within the sample container. Thus, a better distinction between the samples and the liquids within the sample container 10 can be perceived.

Figure 9:
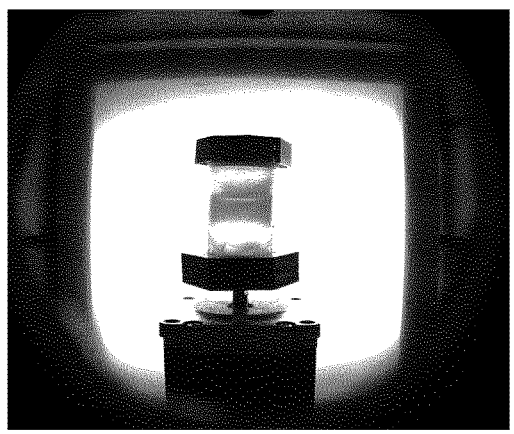
FIG. 9 provide a sequence of images of the sample container captured under white light illumination.
Figure 9:
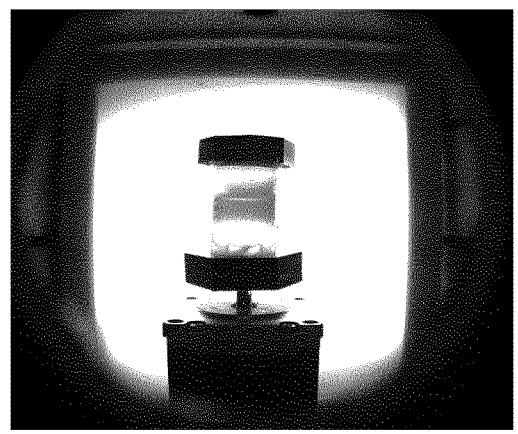
Figure 9:
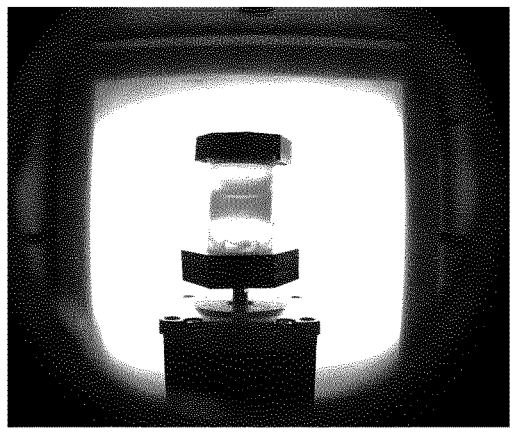
Figure 9:
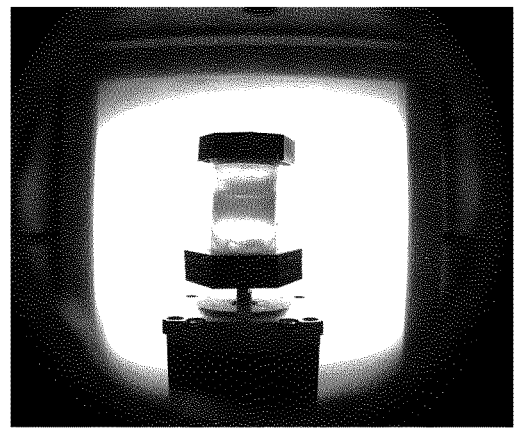
Figure 9:
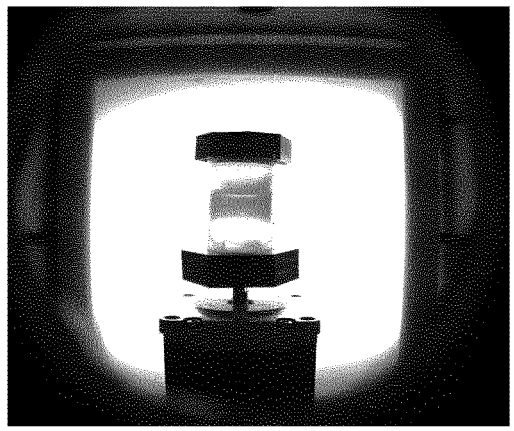
Figure 9:
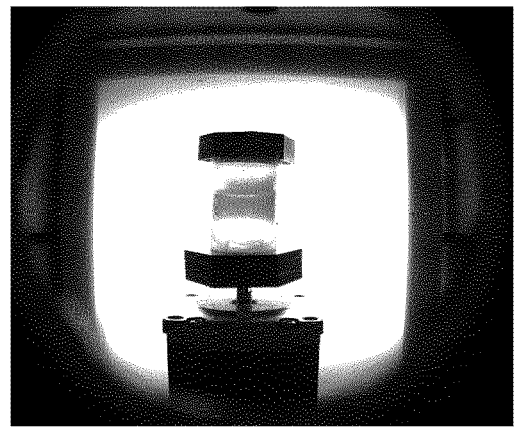
Figure 10:
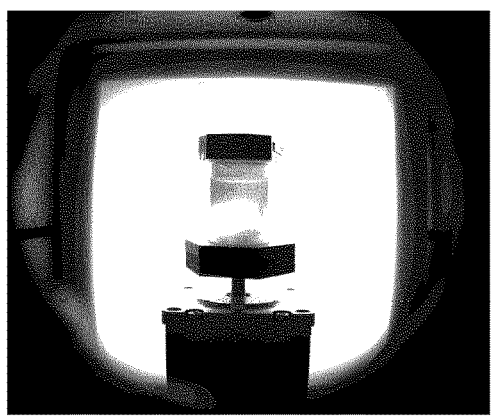
FIG. 10 provide a sequence of images of the sample container captured under blue light illumination.
Figure 10:
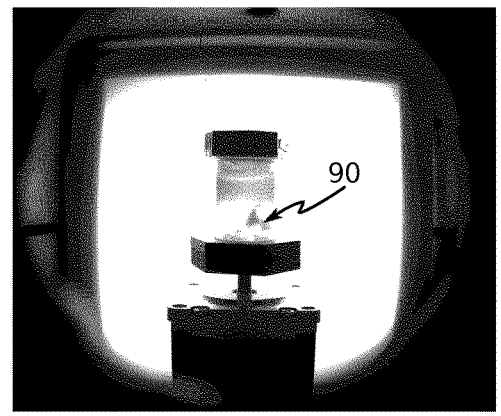
Figure 10:
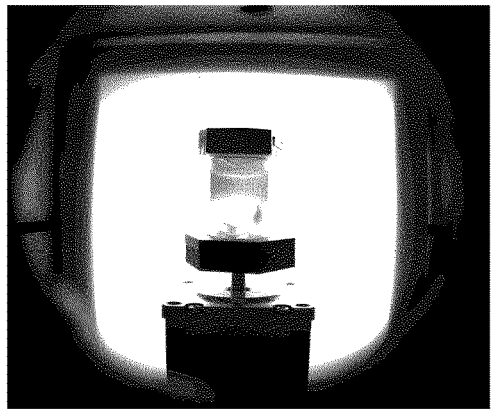
Figure 10:
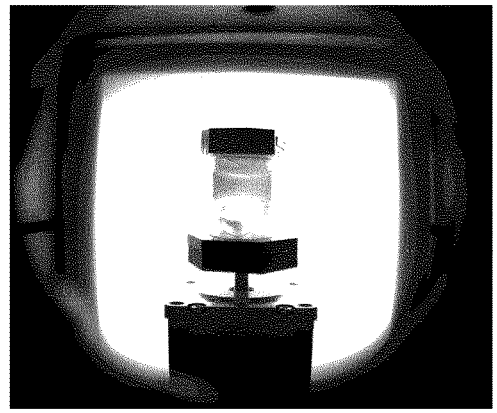
Figure 10:
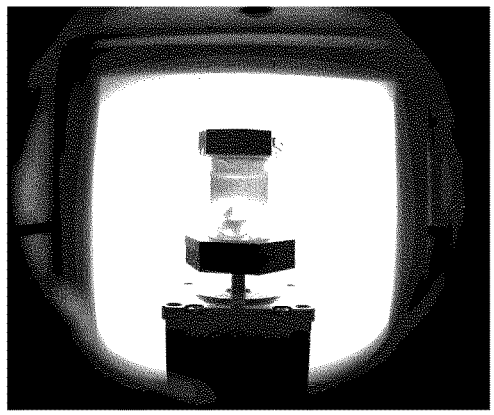
Figure 10:
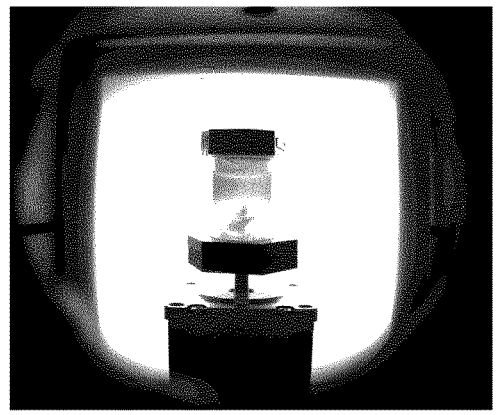

In FIGS. 9 and 10 the capturing of a sequence of images (6 images in this case) after a sudden movement of the sample container 10 is illustrated. That is, a sudden movement of the sample container 10 can be performed, for example, by rotating the sample container 10 (using the motor 30) and stopping. In another embodiment, the sudden movement of the sample container 10 can be done by quickly moving the sample container 10 (or the container base 130, see FIG. 1) in a vertical direction (i.e. up or down). Moving the sample container 10 in a vertical direction can be advantageous, as usually, due to gravity the samples within the sample container 10 can lie in the base of the sample container 10, where it can be harder to detect them. The vertical movement can allow the samples to float in the liquid that can be in the sample container 10, which can ease the process of detecting the samples. In general, any sudden movement of the sample container 10, that can put the samples and/or the liquid that can be inside the sample container 10 in motion can facilitate the sample detection process. The sudden movement of the sample container 10 can be a movement that can last for a short time, such as, 0.1-5 seconds. After the sudden movement of the sample container 10 can be performed a sequence of images, such as, 10 to 100 images, preferably 15 to 50, such as 20 images, of the sample container can be captured sequentially, i.e. one after another with a short time delay. For example, the camera 50 can capture the images with a frame rate of at least 2 frames per second and at most 800 frames per second.

In FIG. 9, the sample container 10 is illuminated with white light. In FIG. 10 the sample container 10, is illuminated with blue light. It can be noticed, that in FIG. 9, it can be more difficult to detect the samples in the sample container 10, since the samples are less visible. The visibility of the samples within the sample container can be less in the case when the source of light produces white light, due to the flickering of white light. However, in FIG. 10, the samples 90 can be more visible and can be detected in multiple images, as contrast with FIG. 9, wherein the samples can be visible in a smaller number of images and/or the clarity of the samples can be lower. Thus, the use of blue light can be more advantageous for the tissue detection method.

Furthermore, it can be advantageous to transform or capture the images in a grayscale format. In other words, each pixel in the image comprises only one parameter—the intensity value. For the sample to be detected, it can be advantageous that the sample container and the preservation liquid within the sample container 10 to be transparent, that is, colorless. For example, formalin is a colorless liquid that is usually used as a preservation (or fixation) liquid to preserve samples from decay and autolysis. In addition, a white background can also be advantageous, such that it can contrast with the sample and thus can increase the visibility of the samples 90 on the images.

Figure 11:
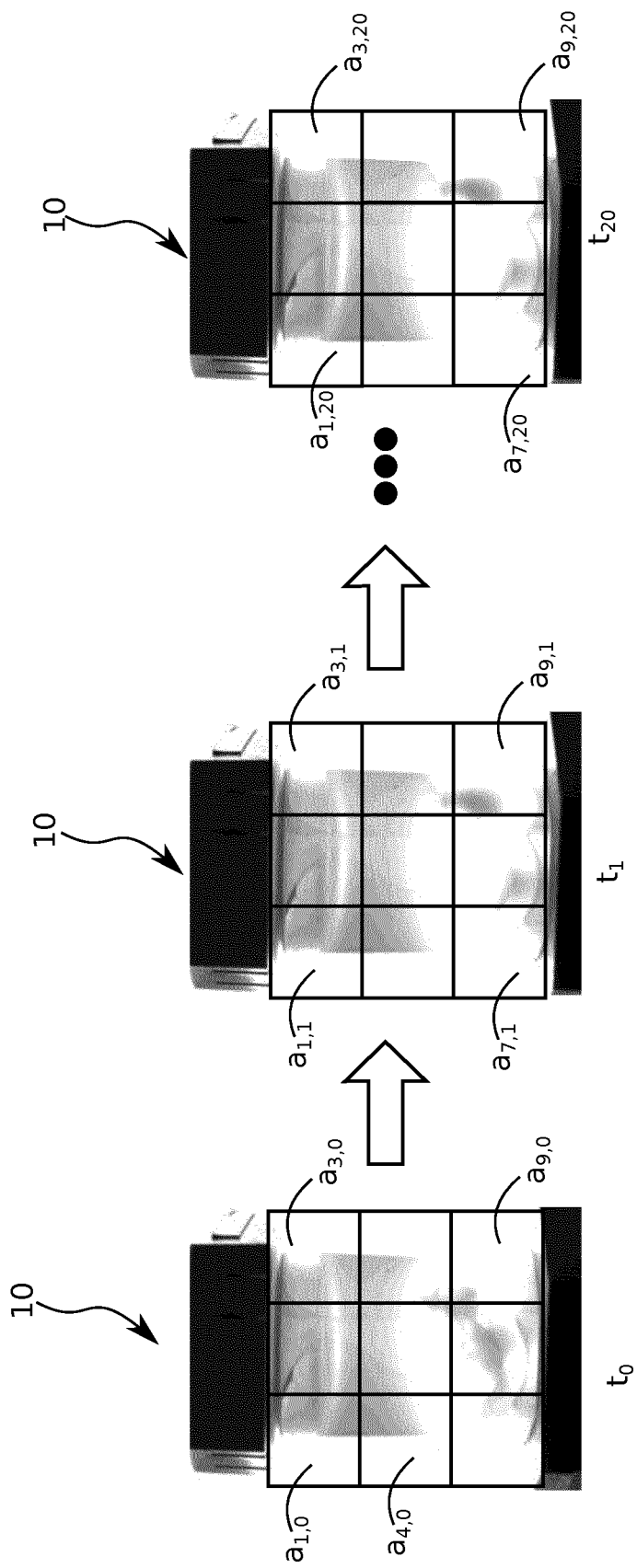
FIG. 11 illustrates a sample detection method according to one embodiment.

In FIG. 11, the method of tissue detection is further illustrated. As discussed, after a sudden movement of the sample container 10 can be performed, a plurality of images can be captured. In the method illustrated in FIG. 11, 20 images can be captured at respective time instants $t_0$, $t_1$, $t_2$ until $t_{20}$. For brevity, only images from three time instance are shown in FIG. 11, more specifically, the images captured at time instances $t_0$, $t_1$ and $t_{20}$ are depicted. The images can be cropped to comprise only the sample container 10. This can increase the performance of the algorithm since fewer pixels need to be considered and processed. For example, the images depicted in FIG. 9 or FIG. 10 may depict the full images, as they were captured and the images depicted in FIG. 11 may depict a cropped version of the captured images. The cropping of the images can be performed, since it can be known where approximately the sample container 10 can appear on the image. For example, system 1 (see FIG. 1), more specifically camera 50, container base 130 and sample container 10 can be arranged such that the sample container 10 appear approximately in the center of the images captured by the camera 50. Thus, knowing approximately the position of the sample container 10 on the image and the size of the sample container 10, the images can be cropped to comprise, mainly the sample container 10, which can increase performance of the tissue detection method.

The images can be divided into tiles. A tile can be a certain region of the image, comprising the pixels of the image on this region. For example, an image can be represented in a data structure in the form of a matrix, which can have 800 rows with 800 columns—i.e. it can be an 800×800 pixel image. A tile can represent only part of the image, for example, it can be a smaller matrix comprising first 100 rows and first 100 columns of the matrix representing the image before tiling. Another tile in the above example can comprise rows 101 to 200 and columns 1 to 100 of the matrix representing the image before tiling.

In FIG. 11, the images are divided into 9 tiles. Each tile can be referred with the character "a" followed by two index numbers separated by a comma. The first index number, which can be referred as the position index, depicts the position of the tile on the image and the second index number, which can be referred as the time index, depicts the time instance when the image is captured. For example, "$a_{1,0}$" represents the first tile at time instance $t_0$, and "$a_{7,20}$" represents the seventh tile at time instance $t_{20}$. The tile's position can be static during a sequence of images. For example, on the sequence of images depicted in FIG. 11, tiles "$a_{1,0}$", "$a_{1,1}$" until "$a_{1,20}$" comprise the same positions on the images captured at time $t_0$, $t_1$ until $t_{20}$. The same holds true for other tiles. For example, tiles "$a_{1,0}$", "$a_{1,1}$" until "$a_{1,20}$" can comprise the first n rows and the first m columns of their respective images, wherein n and m are constant numbers that can define the size of the tiles. In other words, the tiles can have the same position on the each of the sequence of images, and thus, represent the same area of the sample container 10. This, can allow for the detection of intensity changes over time of the pixels within a tile—since the sequence of images comprises images captured at different time instances.

To put it simple, tiles that comprise the same position index, are positioned the same in their respective images. The sequence of images can be captured while keeping the relative position between the sample container 10 and the camera 50 capturing the sequence of images unchanged. Thus, each image can capture the same scene or view. Hence, it can be inferred that the sequence of tiles with same position index represent the same view. By analyzing how intensity values of sequences of tiles that comprise same position index, change over time, it can be inferred the presence or absence of movement in the area represented by the tile. For example, if the intensity values of the pixels of the tiles changes from tile $a_{1,0}$ to $a_{1,1}$, it can be inferred that a movement in the are represented by the tiles with the position index equal to 1, happened between time $t_0$ and $t_1$.

Sudden movements of the sample container 10, can put the liquids and the samples within the sample container 10 in motion. However, due to different physical properties, such as, size, shape, density, mass, volume, material, state of matter, the fixation liquids and the samples comprised in the sample container 10 can move in different manners. More specifically, it can be expected that the liquid moves more frequently and irregularly (in different directions) compared to the samples. Furthermore, since the liquid can be transparent, it remains 'invisible' to the camera in most of its part, except the surface. Thus, liquid movements can be detected only at the surface—i.e. the surface can be the only part of the liquid reflecting the light. To put it simply, movements can be detected on the surface of the liquid and on regions where the samples can be positioned.

A movement can be detected by capturing at least two images of the same region and detecting differences in these two images. Usually a parameter of comparison can be used (such as the color of the pixels of the images) for comparing the images. If difference in the used parameter between two images can be higher than a threshold, than the presence of movement can be inferred.

In a similar process, the change of the tiles with same position index over the sequence of images (i.e. over time) can be detected. For example, tile $a_{1,0}$, $a_{1,1}$, until $a_{1,20}$ can be compared with each other. In some embodiments, for each tile a histogram of colors can be computed. A histogram of colors can comprise for each color the number of pixels that comprise that color. If the images are on a gray scale format, then the histogram can comprise the range of intensity values, which can be integers from 0 to 255, and the number of pixels (of the tile) that comprise the respective intensity values. The area under the histogram can be estimated and can be used as a representative parameter of the tile, i.e. the parameter that can be used to compare the tiles. The area under the histogram can be calculated by multiplying each intensity value with its respective frequency (i.e. frequency here represents the number of pixels comprising the respective intensity value). If the area under the histograms of two tiles can be different (a difference threshold can be used wherein only differences above the threshold can be considered) the presence of a movement can be inferred. That is, tile $a_{8,0}$ comprises more dark pixels, as compared to the same position tile at time instance $t_1$ (i.e. $a_{8,1}$) which comprises mostly brighter pixels. Thus, when the area under the histogram of $a_{8,0}$ and $a_{8,1}$ can be compared it can be expected a significance difference, i.e. a difference above a threshold value, between the two. Thus, the presence of a moving part on this tile can be inferred. And in fact, it can be noticed that at time $t_0$ a sample is present at tile $a_{8,0}$ and at time $t_1$ the sample moved away, i.e. is not present in tile $a_{8,1}$.

In the above example, the area under the histogram of a tile was considered as a representative parameter for the tile. However other parameters can be used too, preferably parameters that can be derived from the intensity values and their respective frequencies calculated on a tile. For example, it can be expected that samples can be represented on the images with darker pixels as compared to the background which can be brighter. Thus, a parameter of the tile can be calculated by counting the number of pixels comprising darker intensities, that can be intensities below a threshold value, for example, below intensity 150. Such pixels, can represent with a high probability a sample. Thus, if the count of such pixels is very small (which can represent artefacts) or is zero it can be inferred that no sample is present in the respective tile. Otherwise, the presence of a sample can be inferred. In addition, if the number of said pixels change over the tiles with same position index, presence of a moving sample can be inferred.

Thus, by comparing tiles of same position over time, motion can be detected on certain regions of the images. However, due to the fact that also movements of the liquid at the surface can be detected, not every detectable change on the tiles can be associated with the presence of a sample. That is, a manner of distinguishing between sample movements and movements detected at the surface of the liquid can be advantageous.

As discussed, due to different physical properties the liquid and the sample move in different manners. More specifically it can be expected that movements of the liquid to be more frequent than movement of the sample. Thus, if a tile is changing frequently, for example, for each consecutive pair of time instances, significant changes on the sequence of tiles with same position index can be detected, then it is most likely an artefact produced by the moving of the liquid at the surface. Thus, this tile can be neglected and not considered while searching for the presence of samples. For example, in the tiles $a_{4,0}$ to $a_{4,20}$ and $a_{5,0}$ to $a_{5,20}$ and $a_{6,0}$ to $a_{6,20}$, representing the surface of the liquid in the sample container 10, frequent changes can be detected, thus they can be neglected. In the tiles $a_{1,0}$ to $a_{1,20}$ and $a_{2,0}$ to $a_{2,20}$ and $a_{3,0}$ to $a_{3,20}$, which represent the part of the sample container 10 above the liquid surface, small to no movements can be detected, thus it can be inferred that no sample can be there. In some other instances, in the tiles $a_{1,0}$ to $a_{1,20}$ and $a_{2,0}$ to $a_{2,20}$ and $a_{3,0}$ to $a_{3,20}$, frequent movements caused by the turbulences of the surface of the liquid can be detected and hence neglected by inferring that they represent movements caused by the surface of the liquid. On the bottom tiles, $a_{7,0}$ to $a_{7,20}$ and $a_{8,0}$ to $a_{8,20}$ and $a_{9,0}$ to $a_{9,20}$, movement can be detected. In addition, this movement may not be frequent and thus it can be inferred that samples were detected.

Furthermore, to facilitate detection of samples patterns on movement of samples can be detected. For example, it can be expected that samples move regularly and slowly, moving from tile to the neighboring tile. Hence, patterns such as decrease of darker pixels in a tile and increase of darker pixels on the neighboring tile can be detected. For example, from time $t_0$ to $t_1$, it can be observed a decrease of dark pixels in tile $a_{8,0}$ and an increase of dark pixels in tile $a_{8,1}$. This, regular behavior of motion can be used to infer presence of a sample in the respective tiles.

The tiles wherein presence of the samples can be detected, can be further analyzed to extract sample features. The distinction between the color of the pixels representing the tissue from the color of the pixels representing the transparent liquid and the background can be used. Thus, whenever on said tiles, a region with dark color surrounded by white color can be encountered, the presence and position of one sample can be inferred. By counting the number of such distinct regions, the number of samples in the sample container can be estimated. For example, in the image captured at time $t_1$, two distinct regions of darker pixels surrounded by brighter pixels can be inferred—i.e. bottom-left corner of tile $a_{8,1}$ and up-left corner of tile $a_{9,1}$. Hence presence of at least two samples in the sample container can be inferred from this image. In some embodiments, the maximum number of samples detected on an image can be used to estimate the number of samples in the sample container.

In addition, a contour, e.g. a line passing through the boundary between the dark pixels representing the tissue and white ones representing the background, can be used to determine the outer bound of the suspected tissue. This outer bound can be used to estimate the size and the shape of the tissue.

If presence of a sample can be detected, as discussed above, its size can be estimated. The area of the side of sample captured on image, can be estimated by counting the number of pixels (darker pixels surrounded by brighter ones) that can represent the sample, e.g. using blob detection. By considering said pixels, that can have an intensity value within a range wherein the probability of it representing a sample can be high, the shape of the side of the sample captured on an image can be estimated. Hence, area and shape of at least one side of a detected sample can be estimated.

In addition, the intensity range of the pixels representing the sample can be used to infer the type of sample. It can be expected, that different samples, under the similar conditions of capturing an image, can be represented by pixels with different intensity values. Hence, a range of intensity values can be associated with a particular sample type. Thus, the intensity values of the pixels representing a detected sample, can be used to infer at least one type that the sample can be.

The use of multiple cameras can further facilitate the estimation of the shape of the tissue. That is, in the upper-mentioned embodiments, such as the one in FIG. 11, one camera can be used. Hence, on each image only two dimensions can be visible. Thus, shape and size of at least one side of detected samples can be inferred.

In some embodiments, at least two cameras can be used, preferably put in different positions relative to the sample container 10, such that they can capture different sides of the sample container 10. In a preferred embodiment, two cameras can be used, wherein the position of the second camera can be reached by rotating in a horizontal or vertical direction by an angle of 90° starting from the position of the first camera. Hence, images from two orthogonal sides of the sample container 10 can be captured.

The presence of at least one other camera that can capture a different side of the sample container compared to the side captured by a first camera, can reveal another perspective. That is, the first camera can estimate the size and shape of a detected sample in at most two dimensions. The at least one other camera, capturing a different side of the sample container, can allow for a further aspect of the detected sample to be estimated. Hence a plausibility check can be performed and/or the size of detected samples can be estimated. For example, for a detected sample a length in from more than one aspect can be estimated and the volume can be estimated.

Other angles, beside 90°, as mentioned above, for example between 30° and 150°, can also be used to position the at least two cameras as discussed above, however due to perspective the size and shapes may be distorted. Hence, in such embodiments perspective need to be considered to revert distortions.

The invention claimed is:

1. A method of detecting at least one sample in a sample container, comprising:
   (a) the sample container comprising a cavity, a volume of said cavity partially or fully occupied with at least one solid sample and at least one fluid;
   (b) at least one camera capturing at least one image of the sample container;
   (c) a data processing device detecting at least one sample in the sample container by processing the at least one image captured by the at least one camera;
   (d) a motion generation system putting the sample container in motion to lift or detach the at least one solid sample in the sample container from a base of the sample container prior to the at least one camera capturing at least one image of the sample container,
   wherein step (c) comprises
   tiling the at least one image captured by the at least one camera;
   wherein a tiling of an image comprises dividing the image into at least two tiles; and
   wherein each tile comprises a plurality of neighboring pixels,
   wherein step (b) comprises the at least one camera capturing a plurality of images of the sample container captured by the at least one camera,
   wherein tiling the at least one image comprises tiling at least two images of the plurality of images,
   wherein the at least two images comprise at least one pair of corresponding tiles and wherein two tiles are corresponding if they comprise a same position on respective images; the method further comprising detecting at least one moving object by comparing at least one pair of corresponding tiles and wherein the presence of a moving object in the tiles is inferred if difference between the compared tiles is found and wherein the difference is above a threshold and wherein step (c) comprises utilizing the detection of at least one moving object to detect the at least one sample.

2. The method according to claim 1 wherein the motion is a rotational and/or translational motion and wherein the motion lasts for at least 0.05 seconds and at most 5 seconds.

3. The method according to claim 1, wherein step (c) comprises cropping the at least one image captured by the at least one camera to comprise only a region of interest, wherein the region of interest comprises the sample container.

4. The method according to claim 1, wherein step (c) comprises calculating a respective color and/or intensity histogram for each of the at least one tile and utilizing each calculated color and/or intensity histogram to detect the at least one sample, wherein the color and/or intensity histogram of a tile comprises a distribution of color values in the tile and/or a distribution of intensity values in the tile.

5. The method according to claim 4, wherein utilizing each calculated color and/or intensity histogram to detect the at least one sample comprises
calculating a respective area of each color and/or intensity histogram,
utilizing each calculated area to detect the at least one sample,
said area calculated by multiplying the color values with their respective frequency and/or by multiplying the intensity values with their respective frequency.

6. The method according to claim 4, wherein utilizing each calculated color and/or intensity histogram to detect the at least one sample comprises, for each color and/or intensity histogram, summing frequencies of a preferred region of color and/or intensity values and utilizing each calculated sum to detect the at least one sample,
wherein said preferred region of color and/or intensity values comprises expected values of the color and/or intensity values of the samples comprised in the cavity of the sample container.

7. The method according to claim 1, further comprising estimating at least one feature of at least one sample in the sample container, wherein the at least one feature comprises:
a shape of at least one of the sides of at least one sample in the sample container; and/or
an area of at least one of the sides of at least one sample in the sample container; and/or
a size of at least one sample in the sample container; and/or-a volume of at least one sample in the sample container; and/or
a color information of at least one sample in the sample container.

8. A method of detecting at least one sample in a sample container, comprising:
the sample container comprising a cavity, a volume of said cavity partially or fully occupied with
at least one solid sample and at least one fluid; and
at least one camera capturing images of the sample container; and
a data processing device processing the images to detect at least one sample in the sample container;
wherein processing the images comprises
tiling at least two of the images to generate at least two tiled images, wherein tiling an image comprises dividing the image into at least two tiles and wherein each tile comprises a plurality of neighboring pixels,
comparing at least two corresponding tiles, wherein at least two tiles are corresponding tiles if they comprise a same position on different tiled images, and determining a presence of a sample in the sample container based on the comparison, wherein comparing the at least two corresponding tiles comprises calculating a changing frequency of the at least two corresponding tiles,
wherein the presence of a sample in the sample container is determined based on the changing frequency,
wherein the method comprises determining that a sample is in the sample container if the changing frequency is within a predefined range, and
wherein the predefined range is set based on an expected size of the sample in the sample container.

9. The method of claim 8, wherein the method comprises a motion generation system putting the sample container in motion to lift or detach the at least one solid sample in the sample container from a base of the sample container prior to the at least one camera capturing at least two images of the sample container.

10. The method of claim 8, wherein comparing the at least two corresponding tiles comprises
calculating for each corresponding tile a respective color and/or intensity histogram and comparing the calculated color and/or intensity histograms;
wherein a color and/or intensity histogram of a tile comprises a distribution of color values in the tile and/or a distribution of intensity values in the tile.

11. The method of claim 10, wherein comparing the calculated color and/or intensity histograms comprises
calculating a respective area of each color and/or intensity histogram and comparing the calculated areas;
wherein calculating an area of a color and/or intensity histogram comprises multiplying the color values with their respective frequency and/or multiplying the intensity values with their respective frequency.

12. The method of claim 10, wherein comparing the calculated color and/or intensity histograms comprises
calculating, for each color and/or intensity histogram, a respective sum of frequencies by summing respective frequencies of color and/or intensity values falling within a predefined range and
comparing the first sum with the second sum.

13. The method of claim 12, wherein said predefined range comprises expected color and/or intensity values of the samples comprised in the cavity of the sample container.

14. The method of claim 8, wherein the method comprises sorting the at least two corresponding tiles consecutively based on the time that respective images are captured and
counting the number of times that a difference is detected based on the comparison of two consecutive corresponding tiles
calculating the changing frequency of the at least two corresponding as a function of said number of times that a difference is detected.

15. A system for detecting at least one sample in a sample container, comprising:
a container base configured to receive at least one sample container;
a camera configured to capture at least one image of the sample container;
a motion generator system configured to produce motion of the sample container to lift or detach the at least one sample in the sample container from a base of the sample container prior to the at least one camera capturing at least one image of the sample container; and a data processing device configured to process at least one image of the sample container to detect at least one sample in the sample container, wherein the camera is configured to capture a plurality of images of the sample container and wherein the data processing device is configured to tile at least two of the images to generate at least two tiled images, by dividing the image into at least two tiles and wherein each tile comprises a plurality of neighboring pixels, compare at least two corresponding tiles, wherein at least two tiles are corresponding tiles if they comprise a same position on different tiled images and determine the presence of a sample in the sample container based on the comparison;

wherein the data processing device is configured to calculate a changing frequency of the at least two corresponding tiles and determine the presence of a sample in the sample container based on the changing frequency; wherein the data processing device is configured to determine that a sample is in the sample container if the changing frequency is within a predefined range;

wherein the predefined range is set based on an expected size of the sample in the sample container.

16. The system of claim 15, wherein the data processing device is configured to calculate for each corresponding tile a respective color and/or intensity histogram and compare the calculated color and/or intensity histograms to determine the presence of a sample in the sample container;

wherein a color and/or intensity histogram of a tile comprises a distribution of color values in the tile and/or a distribution of intensity values in the tile.

17. The system of claim 15, wherein the data processing device is configured to sort the at least two corresponding tiles consecutively based on the time that respective images are captured, count the number of times that a difference is detected based on the comparison of two consecutive corresponding tiles, and calculate the changing frequency of the at least two corresponding as a function of said number of times that a difference is detected.

* * * * *